United States Patent
Moriyama

(10) Patent No.: US 10,207,569 B2
(45) Date of Patent: Feb. 19, 2019

(54) DOOR STRUCTURE OF AUTOMOTIVE VEHICLE

(71) Applicant: MAZDA MOTOR CORPORATION, Hiroshima (JP)

(72) Inventor: Yukihiro Moriyama, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 108 days.

(21) Appl. No.: 15/403,439

(22) Filed: Jan. 11, 2017

(65) Prior Publication Data

US 2017/0240029 A1    Aug. 24, 2017

(30) Foreign Application Priority Data

Feb. 19, 2016    (JP) .................................. 2016-030102

(51) Int. Cl.
*B60J 5/04*    (2006.01)

(52) U.S. Cl.
CPC .............. *B60J 5/047* (2013.01); *B60J 5/042* (2013.01); *B60J 5/0426* (2013.01); *B60J 5/0427* (2013.01);
(Continued)

(58) Field of Classification Search
CPC ...... B60J 5/0463; B60J 5/0465; B60J 5/0466; B60J 5/0413; B60J 5/047; B60J 5/0431;
(Continued)

(56) References Cited

U.S. PATENT DOCUMENTS

| | | | | |
|---|---|---|---|---|
| 3,782,036 A | * | 1/1974 | Clark | B60J 5/0412 49/502 |
| 4,328,642 A | * | 5/1982 | Presto | B60J 5/0406 49/502 |

(Continued)

FOREIGN PATENT DOCUMENTS

| | | |
|---|---|---|
| GB | 2316431 A | 2/1998 |
| JP | H04-94207 U | 8/1992 |

(Continued)

OTHER PUBLICATIONS

An Office Action; "Notification of Reasons for Refusal," issued by the Japanese Patent Office dated Jan. 9, 2018, which corresponds to Japanese Patent Application No. 2016-030102 and is related to U.S. Appl. No. 15/403,439; with English translation.

*Primary Examiner* — Justin B Rephann
(74) *Attorney, Agent, or Firm* — Studebaker & Brackett PC

(57) ABSTRACT

Vertical frame portions provided at both side portions of a door frame are a light-metal casting, plural connecting frames, which are a light-meal hollow extrusion molding, connect the vertical frame portions, the vertical frame portions are provided with protrusion portions which engage with inward connecting frames in a longitudinal direction, plural attachment portions which attach the outward connecting frames and the vertical frame portion are provided at different points in the longitudinal direction, and an outward connecting frame is provided with an upper rib which engages with an engagement recess portion provided at an upper portion of a door outer panel formed in a non-planar shape.

17 Claims, 15 Drawing Sheets

(52) U.S. Cl.
CPC ........... *B60J 5/0431* (2013.01); *B60J 5/0433* (2013.01); *B60J 5/0463* (2013.01); *B60J 5/0483* (2013.01)

(58) Field of Classification Search
CPC ........ B60J 5/0426; B60J 5/0427; B60J 5/042; B60J 5/0483
See application file for complete search history.

(56) References Cited

U.S. PATENT DOCUMENTS

| | | | | |
|---|---|---|---|---|
| 4,512,240 A * | 4/1985 | Mahler | ................. | B60J 5/0405 454/124 |
| 4,711,052 A * | 12/1987 | Maeda | ................. | B60J 5/0405 49/502 |
| 4,845,894 A * | 7/1989 | Herringshaw | ......... | B60J 5/0416 296/146.2 |
| 4,876,825 A * | 10/1989 | Widrig | ................. | B60J 5/0412 49/502 |
| 4,984,389 A * | 1/1991 | Benoit | ................. | B60J 5/0404 296/146.3 |
| 5,398,453 A * | 3/1995 | Heim | .................... | B60J 5/042 49/502 |
| 5,787,645 A * | 8/1998 | Heim | ....................... | B60J 5/042 296/146.5 |
| 5,857,732 A * | 1/1999 | Ritchie | ................. | B60J 5/0416 296/146.11 |
| 5,987,821 A * | 11/1999 | Heim | ....................... | B60J 5/0402 296/146.5 |
| 6,015,182 A * | 1/2000 | Weissert | ................ | B60J 5/0404 29/522.1 |
| 6,135,537 A * | 10/2000 | Giddons | ................ | B60J 5/0431 296/146.6 |
| 6,231,112 B1 * | 5/2001 | Fukumoto | .............. | B60J 5/0412 296/146.5 |
| 6,378,251 B2 * | 4/2002 | Fukumoto | .............. | B60J 5/0412 49/503 |
| 6,415,636 B1 * | 7/2002 | Fukumoto | .............. | B60J 5/0412 292/336.3 |
| 6,550,846 B1 * | 4/2003 | Chappuis | ................ | B60J 5/0427 296/146.5 |
| 6,629,352 B2 * | 10/2003 | Seksaria | ................ | B60J 5/0425 29/428 |
| 7,097,742 B2 * | 8/2006 | Furuse | ................... | B60J 5/0405 296/146.6 |
| 7,363,750 B2 * | 4/2008 | Seksaria | ................ | B60J 5/0416 49/349 |
| 7,380,865 B2 * | 6/2008 | Eckhardt | ................ | B29C 45/14 296/146.2 |
| 8,042,860 B2 * | 10/2011 | Takahashi | .............. | B60J 5/0426 296/146.6 |
| 2001/0022051 A1 * | 9/2001 | Fukumoto | .............. | B60J 5/0412 49/503 |
| 2002/0073627 A1 * | 6/2002 | Hock | ..................... | B60J 5/0406 49/502 |
| 2003/0006625 A1 * | 1/2003 | Moriyama | ............. | B60J 5/0412 296/146.6 |
| 2003/0152745 A1 * | 8/2003 | Wagenblast | ...... | B29C 45/14467 428/119 |
| 2004/0026957 A1 * | 2/2004 | Bodin | ................... | B60J 5/0429 296/146.6 |
| 2004/0119318 A1 * | 6/2004 | Moriyama | ............. | B60J 5/0425 296/146.6 |
| 2004/0195860 A1 * | 10/2004 | Koellner | ............... | B60J 5/0412 296/146.5 |
| 2004/0216387 A1 * | 11/2004 | Furuse | ................... | B60J 5/0405 49/502 |
| 2005/0046228 A1 * | 3/2005 | Armbruster | ............ | B60J 5/0431 296/146.6 |
| 2007/0039245 A1 * | 2/2007 | Buchta | ................... | B60J 5/0416 49/502 |
| 2015/0202950 A1 * | 7/2015 | Garimella | .............. | B60J 5/0443 49/501 |
| 2015/0352932 A1 * | 12/2015 | Mildner | ................. | B60J 5/0429 296/193.05 |
| 2016/0159207 A1 * | 6/2016 | Ogawa | .................. | B60J 5/0427 49/504 |
| 2017/0240031 A1 * | 8/2017 | Moriyama | ............. | B60J 5/0412 |

FOREIGN PATENT DOCUMENTS

| | | |
|---|---|---|
| JP | H05-319092 A | 12/1993 |
| JP | H10-037592 A | 2/1998 |
| JP | 2001-246934 A | 9/2001 |
| JP | 2005-041266 A | 2/2005 |
| JP | 2010-195092 A | 9/2010 |
| JP | 2013-163441 A | 8/2013 |

* cited by examiner

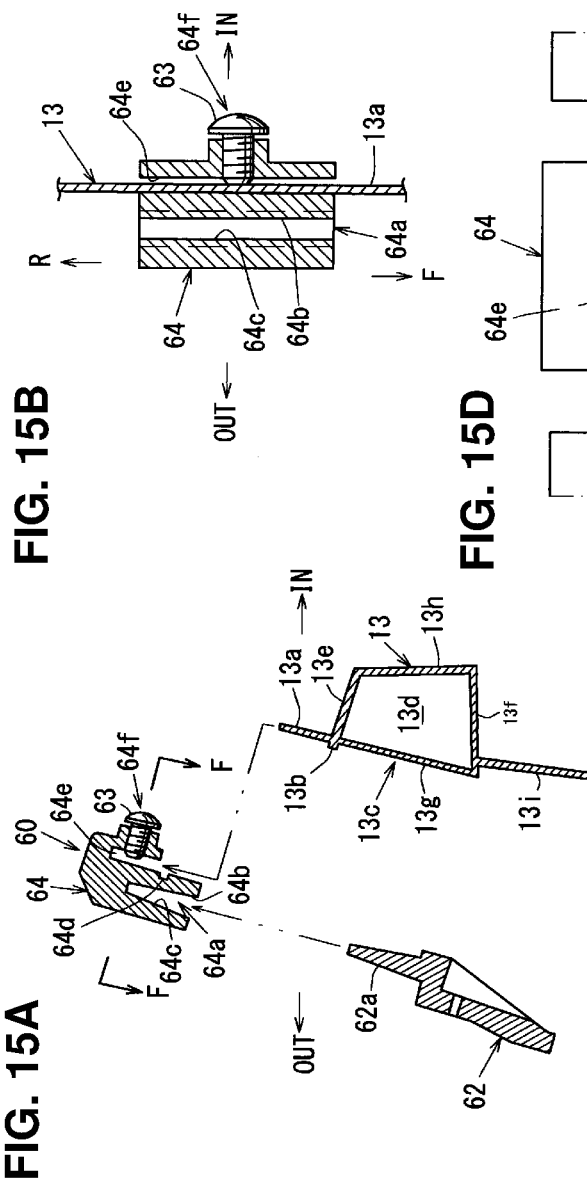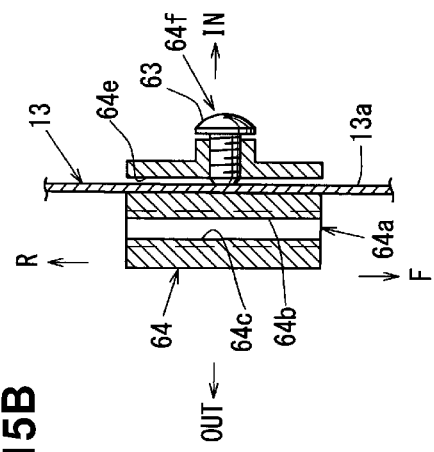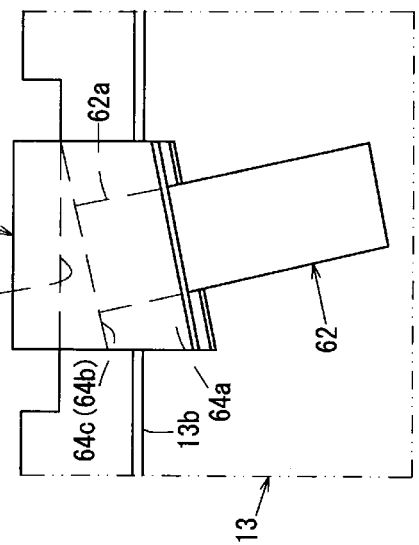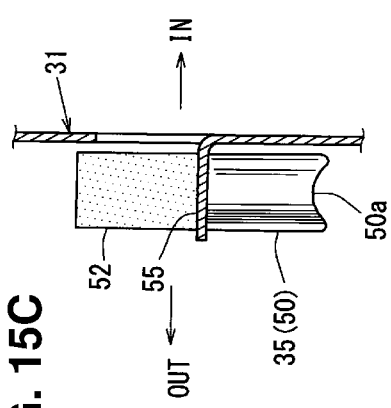
FIG. 15A
FIG. 15B
FIG. 15C
FIG. 15D

DOOR STRUCTURE OF AUTOMOTIVE VEHICLE

BACKGROUND OF THE INVENTION

The present invention relates to a door structure of an automotive vehicle which is applicable to a side door or a back door of the vehicle.

Since a light-metal material, such as aluminum or aluminum alloy, is relatively light and low cost compared to steel or the like, a casting or hollow extrusion molding using this light-metal material has been generally used for the door structure.

In a case of the casting, there is an advantage in integrally forming of a member with reduced forming steps even if the member becomes rather complex in order to provide an attachment portion for another member or the like. However, there is a concern that a large-sized mold may be required to form plural parts in a single member, which may increase costs reversely, or the strength of the member may vary improperly because of its complex shape or the like.

In a case of the extrusion molding, meanwhile, there is an advantage in forming a member having proper strength with reduced costs because the extrusion molding has a high rigidity in its longitudinal direction (an extrusion direction) and also its width-directional strength is increased by forming a closed cross section which may be made easily. However, it has a disadvantage that its forming is limited to a straight forming manner.

That is, a member of the door structure, such as an outer panel or a guide rail, is generally configured, in a case in which the door is a side door, such that its front view is designed to be curved from perspectives of design property or functionality. Accordingly, in a case in which a door frame is composed only by frame members which are made by an extrusion molding process such that the frame members are configured to extend straightly in a longitudinal direction thereof, it is difficult to attach another member having its curved front view described above to this door frame, which may deteriorate precision and reliability of attachment.

Therefore, a door structure which is constituted by combining the extrusion molding and the casting has been recently proposed, in order to solve the above-described concerns of the extrusion molding and the casting, utilizing the above-described advantages of those, by UK Patent Application GB 2316431 A or Japanese Patent Laid-Open Publication No. 2005-041266.

The above-described first patent document discloses the door structure in which a door frame is constituted by hollow extrusion moldings (12, 16, 30, 34, 40) which are respectively formed in a straight shape, castings (18, 24) which are respectively provided with projections (44) integrally formed at each end portion thereof, and nodes (41a-41c) which are respectively made by the casting process. This door structure is configured such that the projections (44) are pressed into hollow portions of the extrusion moldings, thereby joining the extrusion moldings and the castings together, and also the nodes (41a-41c) are inserted into the hollow portion of the extrusion moldings, thereby joining the extrusion moldings together via the nodes. However, since the door structure of the first patent document is configured such that the plural frames are formed in a frame shape so as to create a single face, without being arranged on an outward side as well as on an inward side, in a vehicle width direction, of the door structure, there is room for improvement from viewpoints of the safety against a vehicle collision, such as a side collision.

Further, the above-described second patent document discloses the door structure for a vehicle which comprises a door inner (18) which is made of aluminum casting and forms a skeleton of the door and a beltline reinforcement (14) which is made of aluminum extrusion molding and extends in a vehicle longitudinal direction along a beltline portion of the door. This beltline reinforcement (14) is fixed in a state in which its front end portion contacts a rear wall portion of the door inner (18) or is positioned closely to the rear wall portion of the door inner (18). In the case of the door structure for the vehicle of the above-described second patent document, there is only the single reinforcement arranged in the vehicle width direction and also the door inner (18) and the beltline reinforcement (14) are not joined by engagement (insertion). Therefore, there is room for improvement from the viewpoints of the safety against the vehicle collision, such as the side collision, as well as the door structure of the first patent document.

Meanwhile, in a manufacturing process of the door, a module (auxiliary device) positioned inside the door, such as a window regulator, is generally attached from a vehicle inward side through an opening formed at a center of the door. Alternatively, after an inner panel and an outer panel have been assembled together, the module is inserted into a door body from above, passing through a door-window insertion hole which is provided at an upper portion of the door body so as to allow a door window to get in or out, and then attached to its attachment position. Accordingly, it is difficult to arrange the internal module at a gap between door frames of the door structure and smoothly attach this internal module to the frames, so that there is a concern that the assemblability (productivity) may be inferior.

Moreover, in this case, a space for inserting the internal module into the door body and moving it to its attachment position or a work space for the attachment are required to be provided, which may improperly influence a shape of a cross section of the door outer panel and the like. Consequently, it is difficult to secure a superior door design. The above-described patent documents refer to nothing about an attaching step or position of the internal module to the door frames. Thus, there is still room for improvement on the above-described problems or concerns regarding the sessemblability and the design property of the door outer panel.

SUMMARY OF THE INVENTION

Accordingly, an object of the present invention is to provide a door structure of an automotive vehicle which can compatibly attain the design property, the productivity, and the collision safety in a higher-order level, making a lightweight door frame by using a light-metal casting and a light-meal hollow extrusion molding.

The present invention is a door structure of an automotive vehicle, comprising a door frame comprising vertical frame portions which are provided at both side portions, in a vehicle longitudinal direction, of the door frame and plural connecting members which connect the vertical frame portions, the vertical frame portions being a light-metal casting, the plural connecting members being a light-meal hollow extrusion molding, and a door outer panel formed in a non-planar shape, wherein the plural connecting members of the door frame comprise an inward connecting member which is positioned on an inward side, in a vehicle width direction, of the door frame and an outward connecting member which is positioned on an outward side, in the vehicle width direction, of the door frame, the vertical frame portions of the door frame are provided with protrusion portions which respectively engage with the inward connecting member in a longitudinal direction of the inward connecting member, plural attachment portions which attach the outward connecting member and the vertical frame portions are provided at different points in a longitudinal direction of the outward connecting member, and the outward connecting member is provided with a rib or flange which engages with a groove provided at an upper portion of the door outer panel.

According to the present invention, the light-weight and high-rigidity of the door, the assemblability of the auxiliary device, and the design property can be compatibly attained by improving a connecting structure of the connecting member made of the extrusion molding and the vertical frame portion made of the casting and a functional sharing between these connecting member and vertical frame portion and the door outer panel. Herein, the above-described light metal includes aluminum, magnesium, or alloy of these. Further, the above-described outward connecting member can be provided with any protrusion portion which protrudes upward, such as a rib or flange, as long as the protrusion portion is capable of engaging with the groove provided at the upper portion of the non-planar shaped door outer panel.

In an embodiment of the present invention, the door frame comprises a pair of upper-and-lower inward connecting frames as the inward connecting member, which are provided at upper and lower levels of the door frame so as to connect the vertical frame portions, and the inward connecting frames and the vertical frame portions are configured in a frame shape. According to this embodiment, since the vertical frame portions made of the casting and the upper-and-lower inward connecting frames made of the hollow extrusion molding are configured in the frame shape, the light-weight and high-rigidity door can be made at low cost.

In another embodiment of the present invention, the door outer panel is made of resin, the upper portion and a one-side portion of the door outer panel engage with the door frame, and a lower portion and the other side portion of the door outer panel are joined the door frame. According to this embodiment, the assemblability of the door outer panel and the door frame can be improved and a thermal expansion difference can be absorbed.

In another embodiment of the present invention, the inward connecting member and the protrusion portions of the vertical frame portions which engage with the inward connecting member are fixed by an adhesive agent and a pin. According to this embodiment, the assemblability of the inward connecting members and the vertical frame portions can be improved and a positional shift (mismatch) of these can be prevented.

In another embodiment of the present invention, the door is a side door, and the vertical frame portions of the door frame are configured such that a front-side one thereof overlaps a hinge pillar when viewed from a vehicle side and a rear-side one thereof overlaps a pillar located in back of the door when viewed from the vehicle side. According to this embodiment, a load of a vehicle longitudinal direction, such as a vehicle-frontal-collision load, can be received and a survival space for passengers in a cabin can be maintained.

Other features, aspects, and advantages of the present invention will become apparent from the following description which refers to the accompanying drawings.

BRIEF DESCRIPTION OF THE DRAWINGS

FIG. 15A is an exploded view of a pressing member, a receiving member, and a door-beltline constituting member, FIG. 15B is a sectional view taken along line F-F of FIG. 15A, FIG. 15C is an explanatory diagram showing an attachment structure of a fan-shaped guide member and a down stopper, and FIG. 15D is an explanatory diagram of the receiving member.

DETAILED DESCRIPTION OF THE INVENTION

Figure 1:
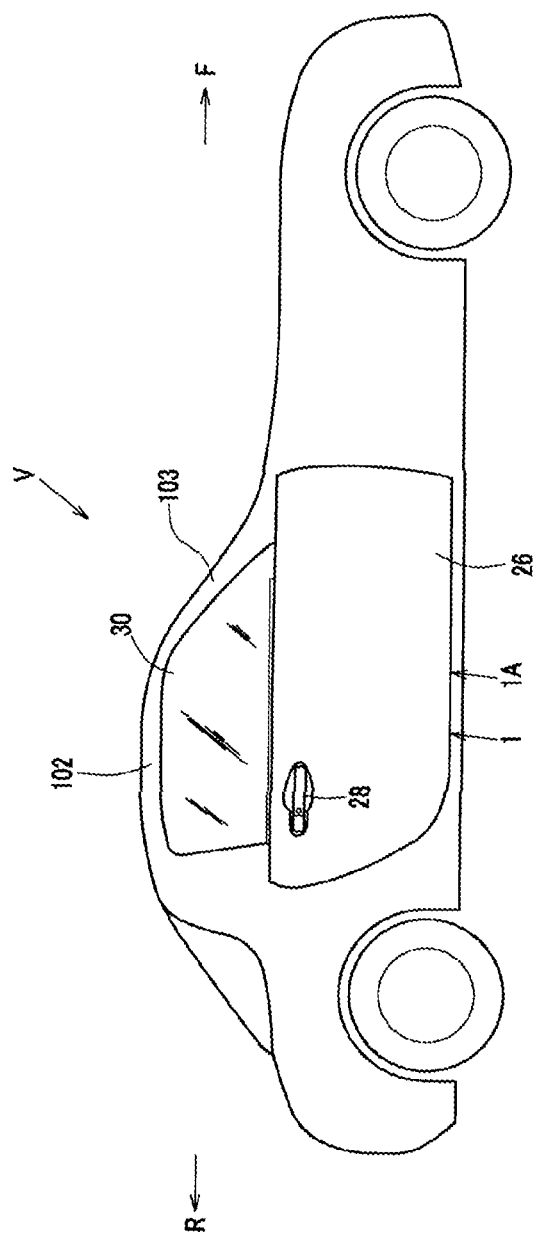
FIG. 1 is a right side view of an automotive vehicle which has a sashless-type side door structure.
Figure 2:
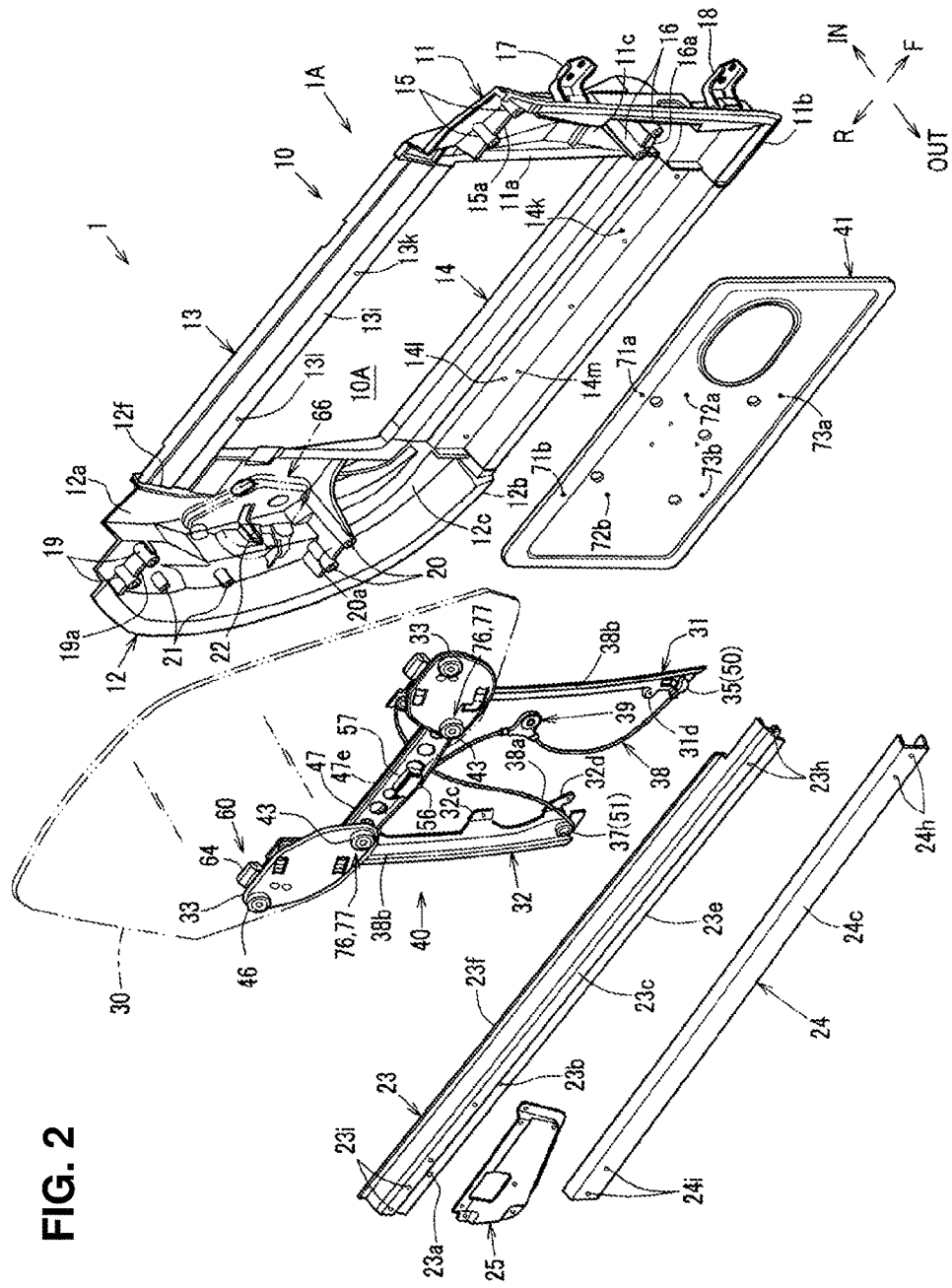
FIG. 2 is an exploded perspective view of the door structure in a state in which a door outer panel is removed.
Figure 3:
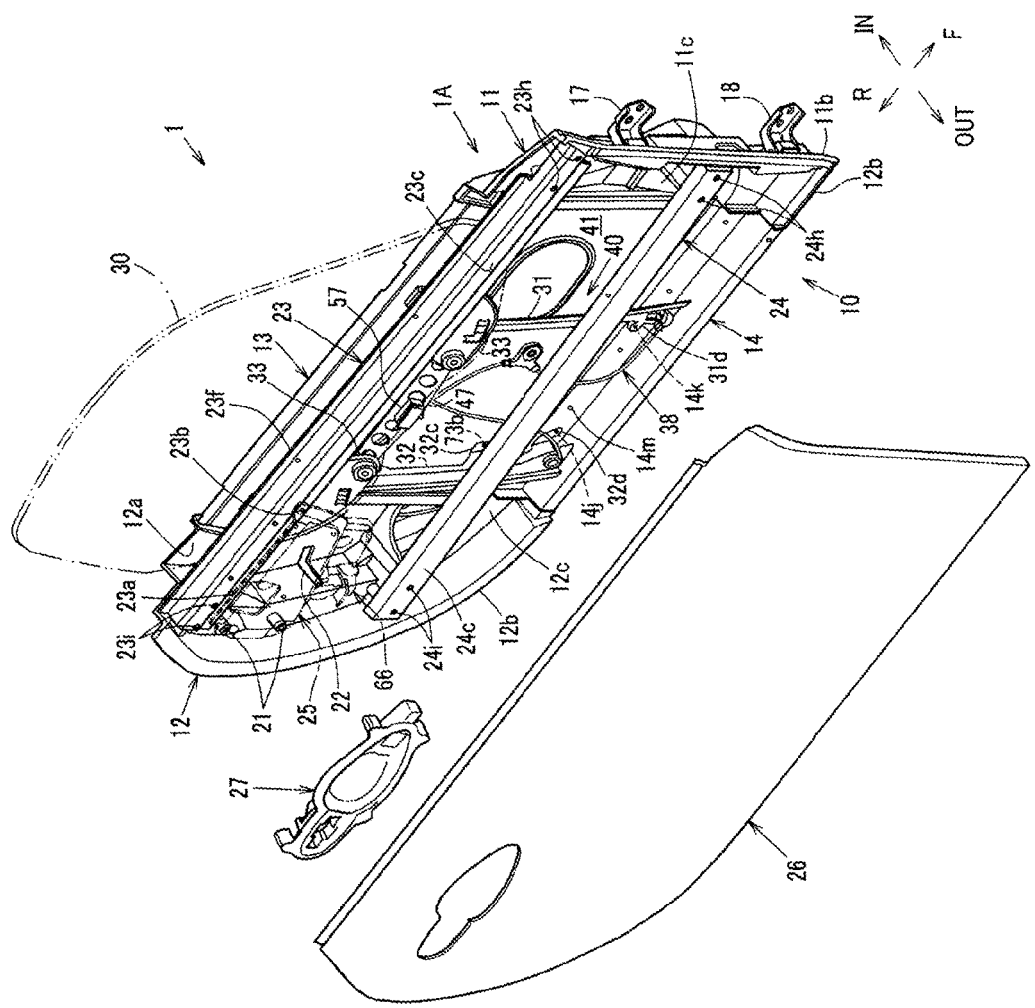
FIG. 3 is a perspective view showing an internal structure of the door structure without the door outer panel.
Figure 4:
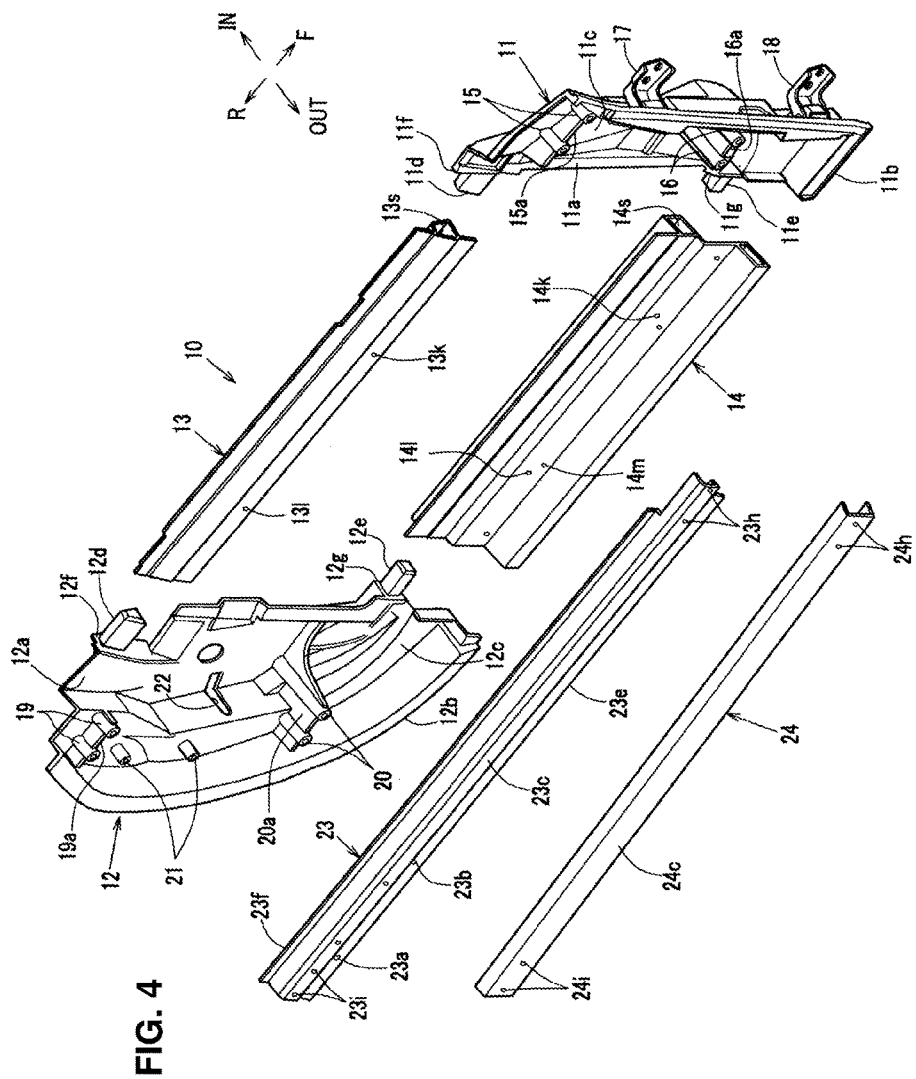
FIG. 4 is an exploded perspective view of a door frame when viewed from an outward side, in a vehicle width direction, of the vehicle.
Figure 5:
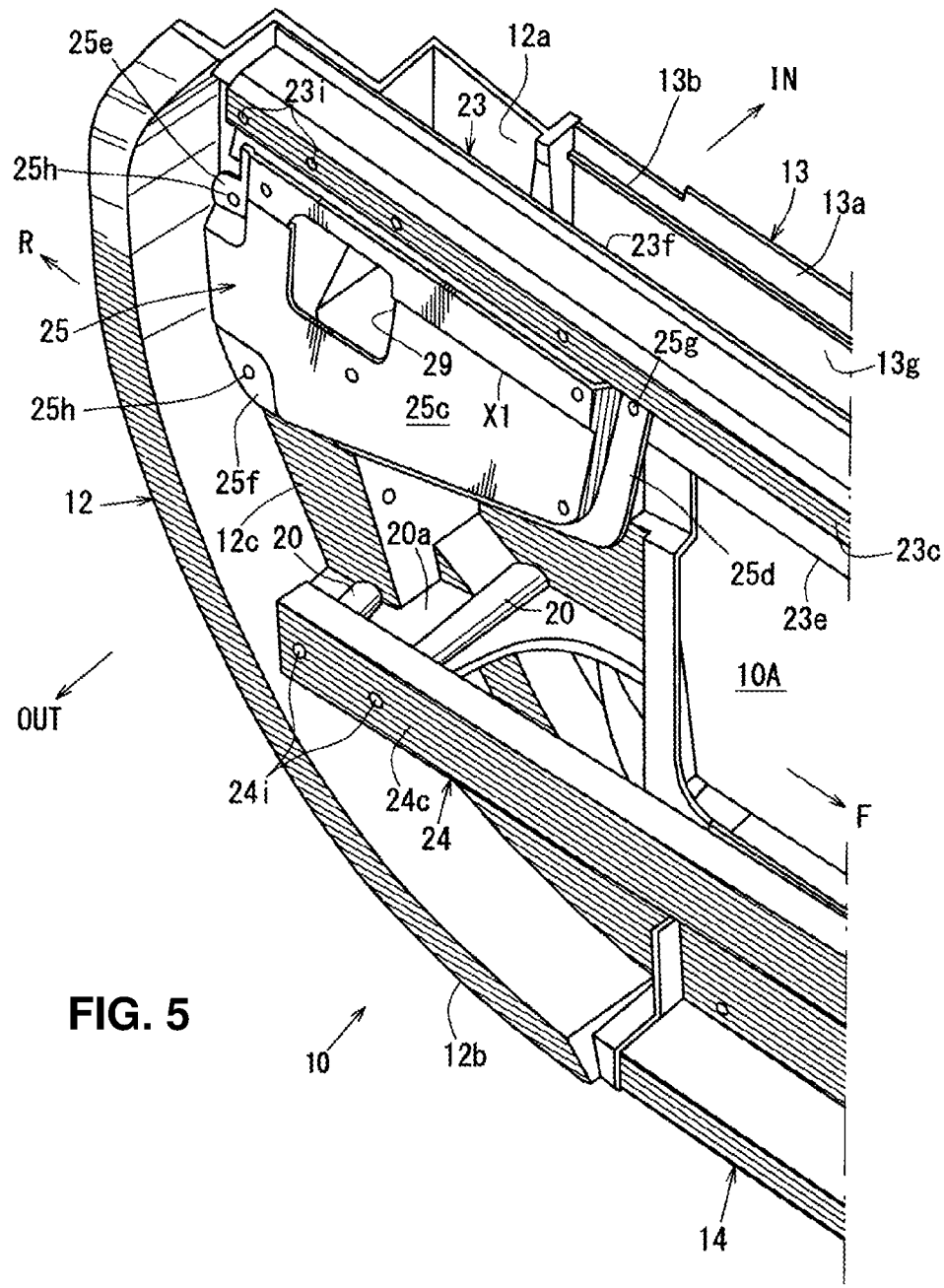
FIG. 5 is a major-part enlarged perspective view of the structure shown in FIG. 3 in a state in which an outer-handle attaching bracket is provided.
Figure 6A:
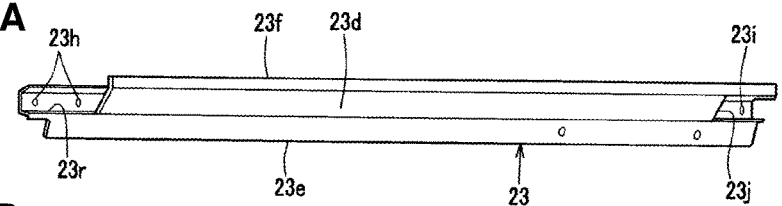
FIGS. 6A, 6B, 6C are exploded perspective views of the door frame when viewed from an inward side, in the vehicle width direction, of the vehicle.
Figure 6B:
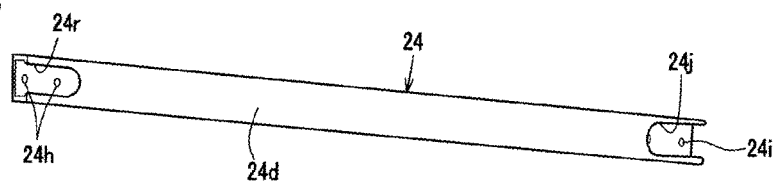
Figure 6C:
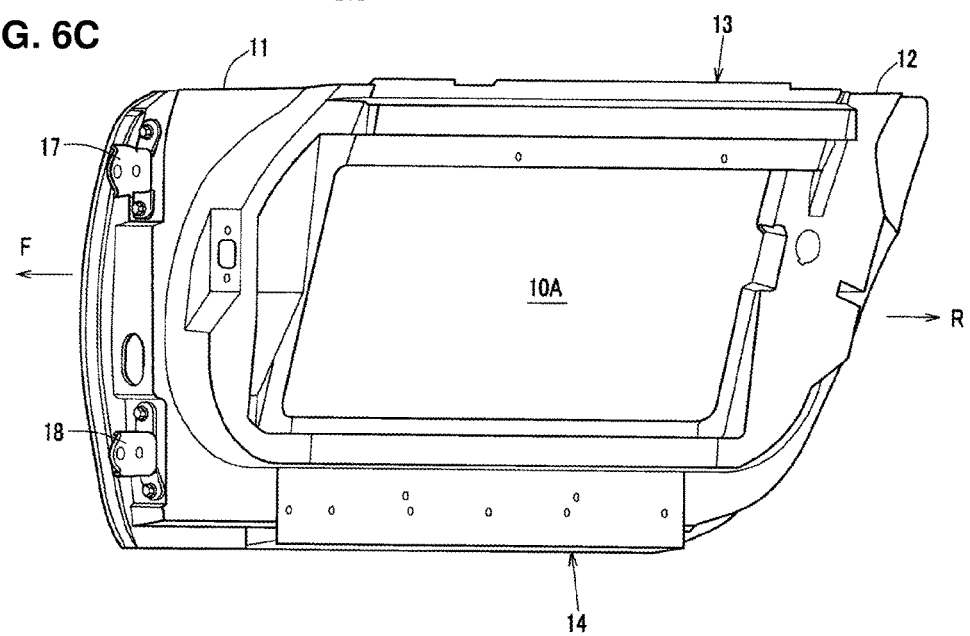
Figure 7A:
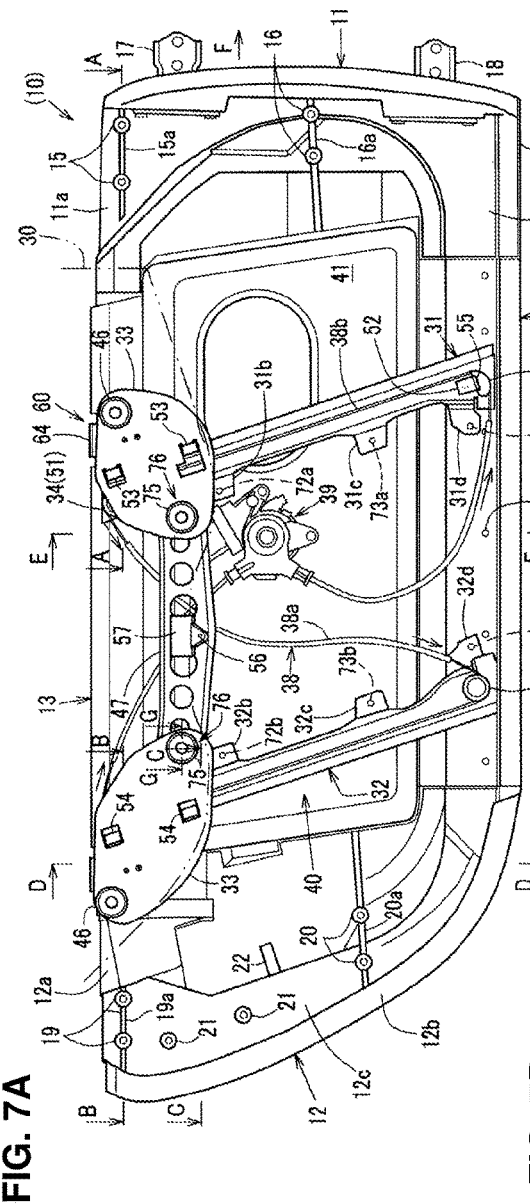
FIGS. 7A, 7B are explanatory diagrams of the structure in a state in which the door outer panel is detached.
Figure 7B:
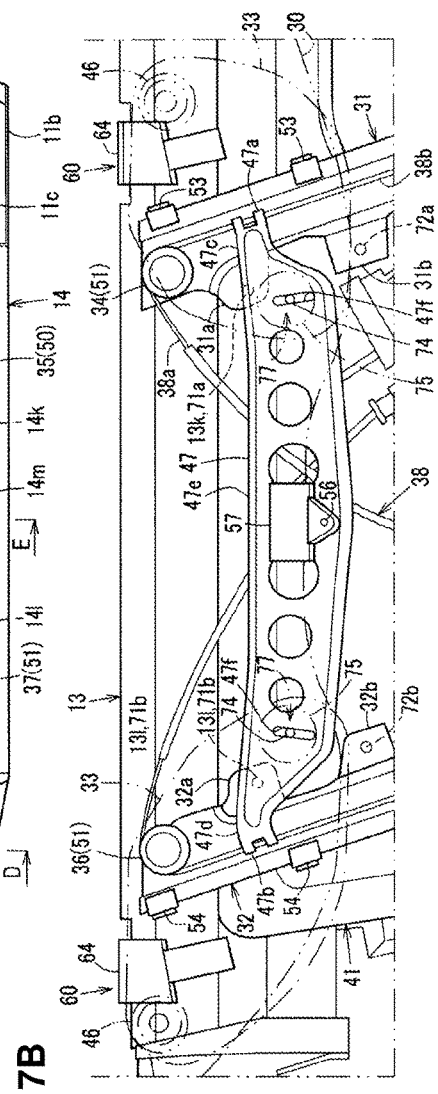
Figure 8:
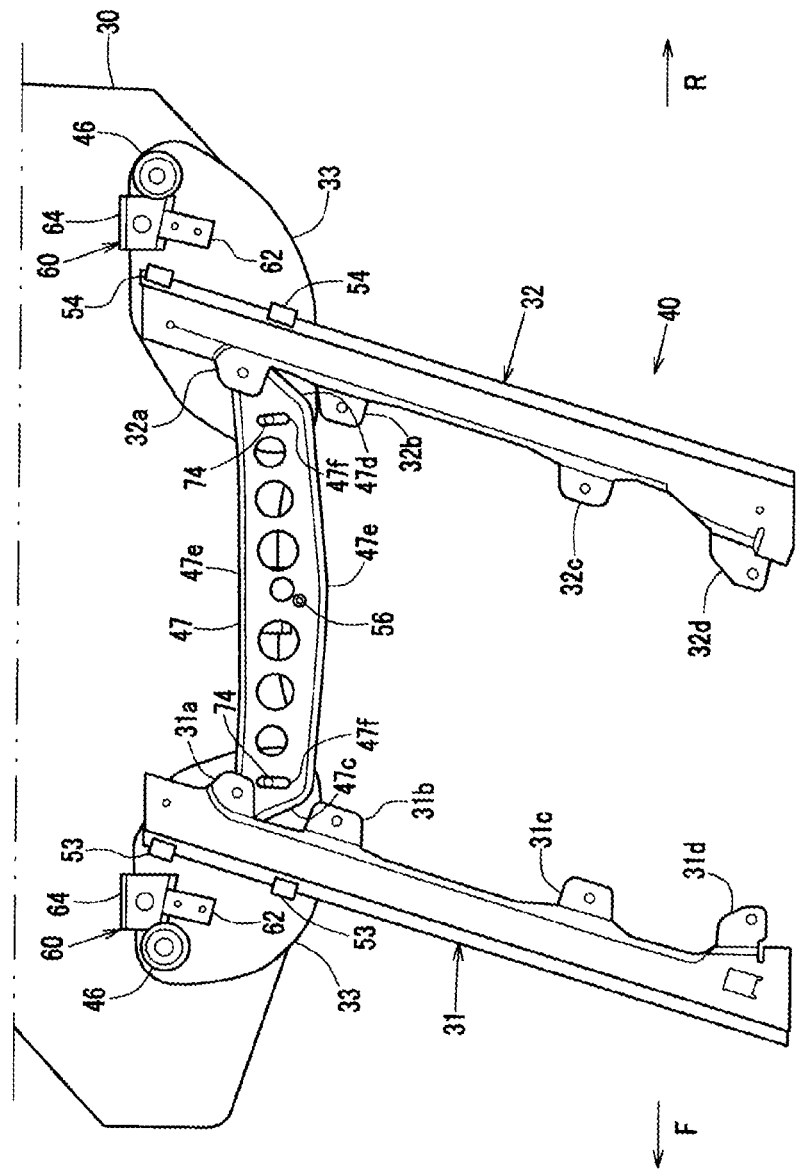
FIG. 8 is an explanatory diagram of a structure of a window regulator when viewed from the inward side, in the vehicle width direction, of the vehicle.
Figure 9:
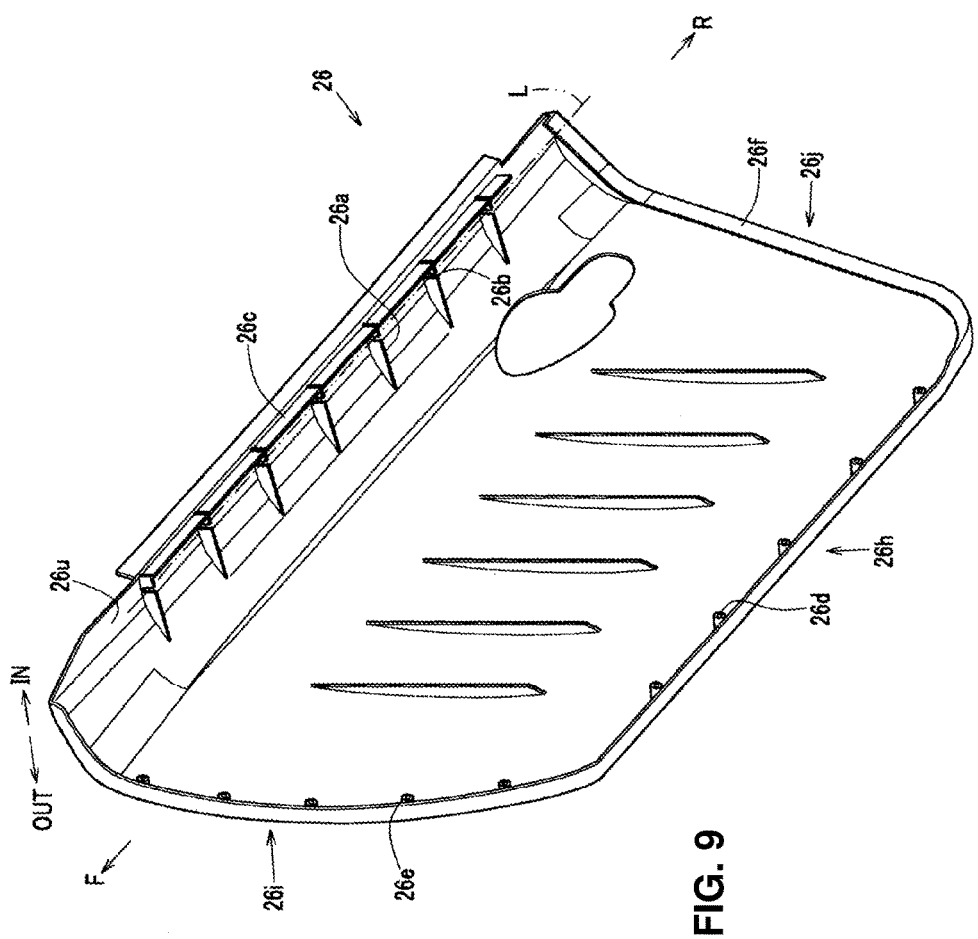
FIG. 9 is a perspective view of the door outer panel when viewed from below.
Figure 10A:
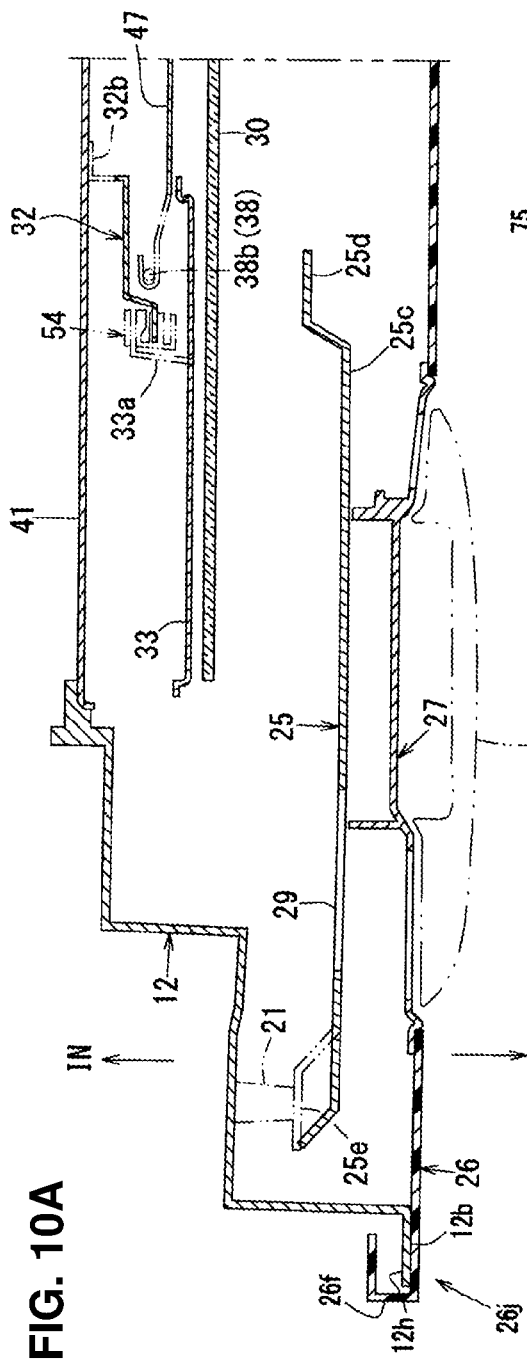
FIG. 10A is a sectional view of the side door structure taken along line C-C of FIG. 7A.
Figure 10B:
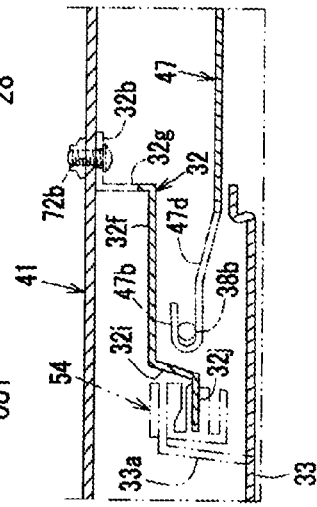
FIG. 10B is a major-part enlarged view of FIG. 10A.
Figure 10C:
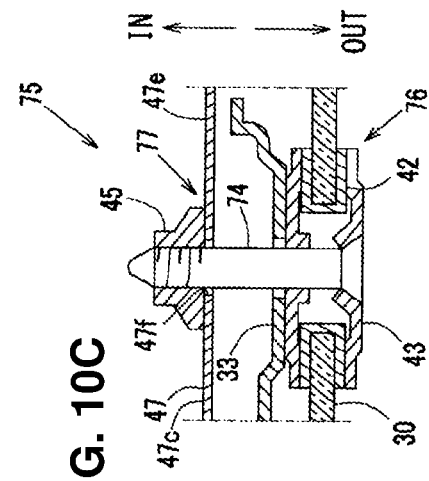
FIG. 10C is an enlarged sectional view taken long line G-G of FIG. 7A.
Figure 11A:
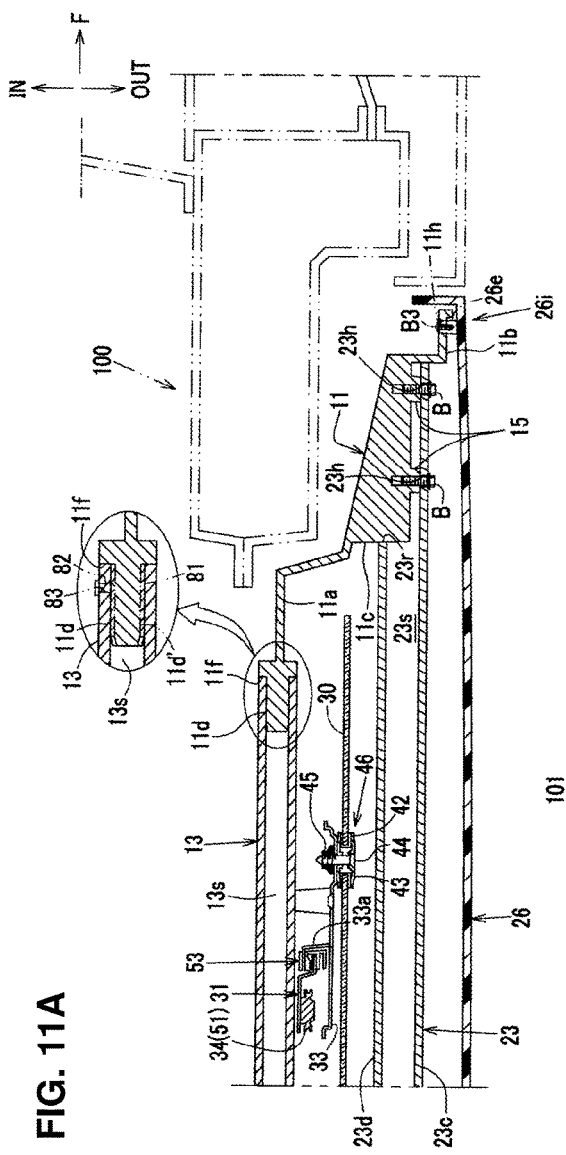
FIGS. 11A, 11B are sectional views of the side door structure taken along lines A-A and B-B of FIG. 7A.
Figure 11B:
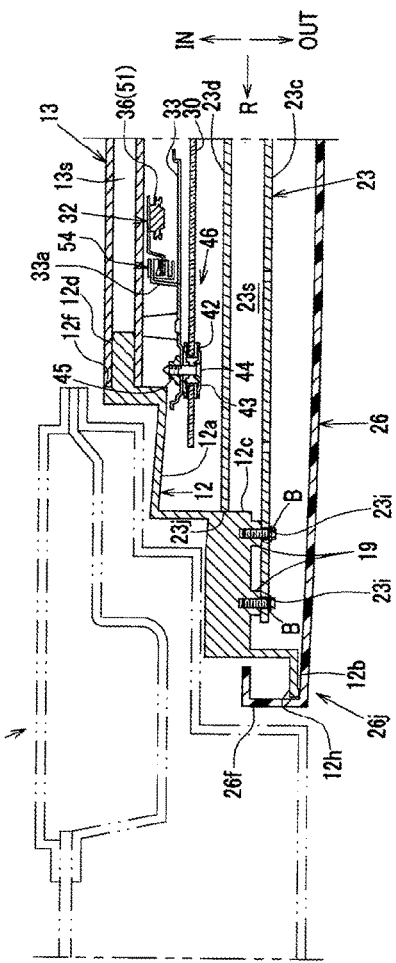
Figure 12:
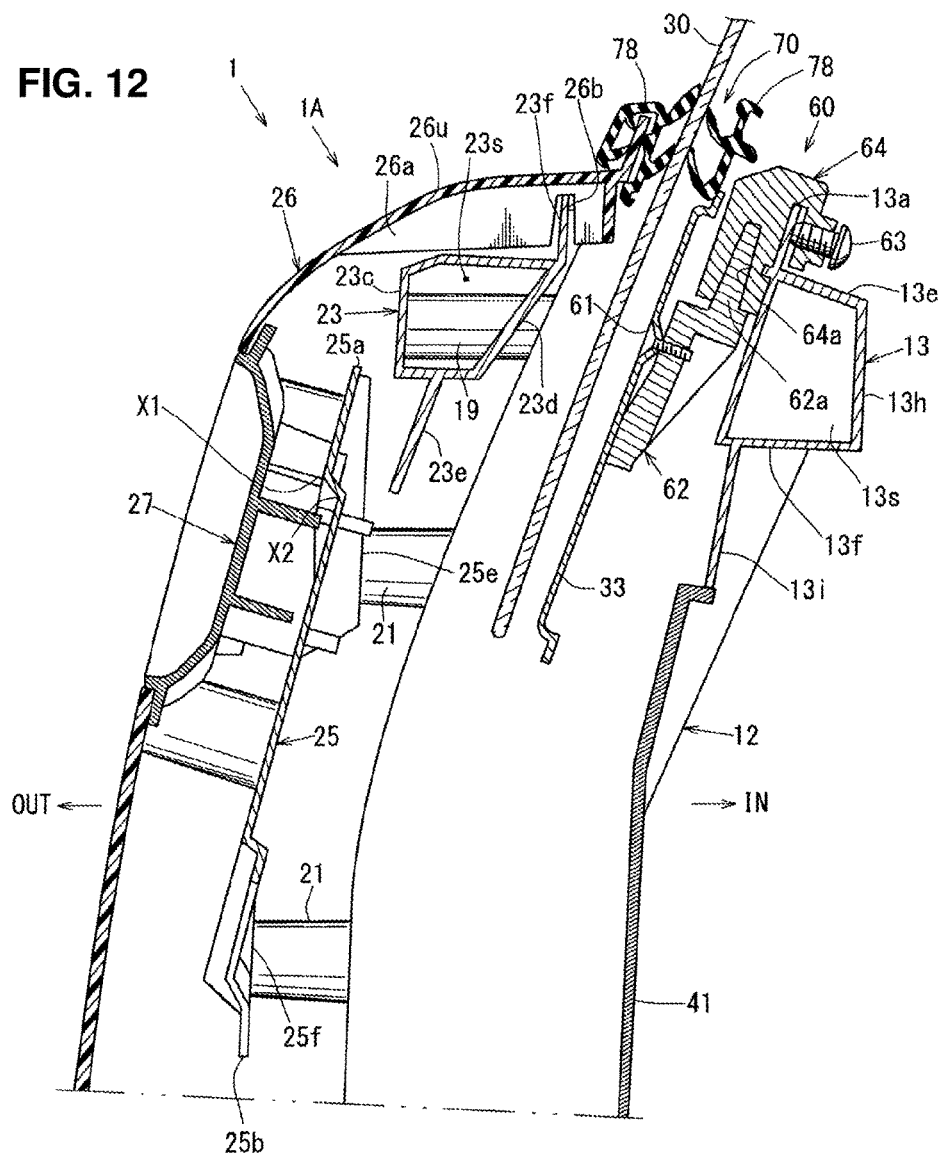
FIG. 12 is a major-part perspective sectional view of the side door structure taken along line D-D of FIG. 7A.
Figure 13:
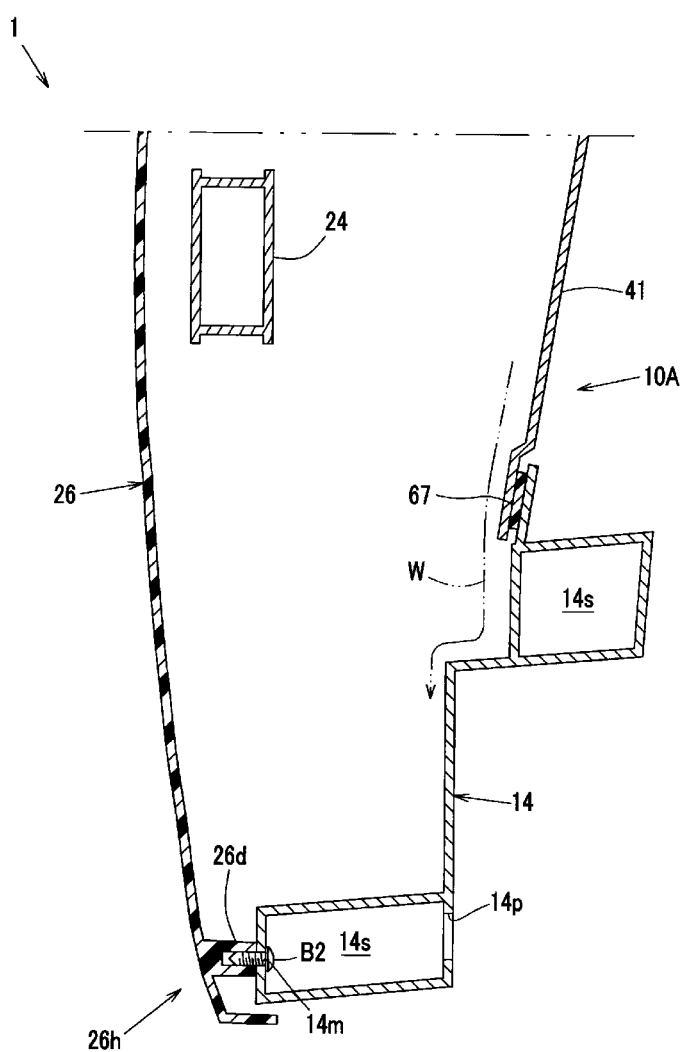
FIG. 13 is a major-part perspective sectional view of the side door structure taken along line E-E of FIG. 7A.

Hereafter, an embodiment of the present invention will be specifically described referring to the drawings. The drawings show a door structure of an automotive vehicle. FIG. 1 is a right side view of an automotive vehicle which has a sashless-type side door structure, FIG. 2 is an exploded perspective view of the door structure in a state in which a door outer panel is removed, FIG. 3 is a perspective view showing an internal structure of the door structure without the door outer panel, FIG. 4 is an exploded perspective view of a door frame when viewed from an outward side, in a vehicle width direction, of the vehicle, FIG. 5 is a major-part enlarged perspective view of the structure shown in FIG. 3 in a state in which an outer-handle attaching bracket is provided, FIGS. 6A, 6B, 6C are perspective views for explaining a beltline reinforcement outer, an impact bar, and an inward frame, respectively, when viewed from an inward side, in the vehicle width direction, of the vehicle, FIG. 7A is an explanatory diagram of the structure in a state in which the door outer panel is detached and FIG. 7B is a major-part enlarged view of FIG. 7A, FIG. 8 is an explanatory diagram of a structure of a window regulator when viewed from the inward side, in the vehicle width direction, of the vehicle, FIG. 9 is a perspective view of the door outer panel when viewed from below, FIG. 10A is a sectional view of the side door structure taken along line C-C of FIG. 7A, FIG. 10B is a major-part enlarged view of FIG. 10A, and FIG. 10C is an enlarged sectional view taken long line G-G of FIG. 7A, FIG. 11A is a sectional view taken along line A-A of FIG. 7A and FIG. 11B is a sectional view taken along line B-B of FIG. 7A, FIG. 12 is a major-part perspective sectional view of the side door structure taken along line D-D of FIG. 7A, and FIG. 13 is a major-part perspective sectional view of the side door structure taken along line E-E of FIG. 7A. In the figures showing the embodiment described below, an arrow F shows a vehicle forward side, an arrow R shows a vehicle rearward side, an arrow IN shows a vehicle inward side (hereinafter, referred to as "inward" or "inward side"), and an arrow OUT shows a vehicle outward side (hereafter, referred to as "outward" or "outward side").

The door structure of the automotive vehicle of the present embodiment is applied to a sashless-type side door 1, which comprises a door body 1A and a door window glass 30 as a door window (including a reinforced-plastic made window). The door body 1A comprises, as shown in FIGS. 2 and 3, a door frame 10, a door outer panel 26 which forms a side door body, and a window regulator 40 to elevate or lower the door window glass 30.

<Door Frame Structure>

As shown in FIGS. 2-7A, the door frame 10 comprises vertical frame portions 11, 12 which are provided at both sides (i.e., the front-side vertical wall portion 11 and the rear-side vertical frame portion 12), in a vehicle longitudinal direction, of the door frame 10 and plural connecting frames 13, 14, 23, 24 which connect the front-side vertical frame portion 11 and the rear-side frame portion 12 in the vehicle longitudinal direction, respectively. An inner space of the door body 1A is formed by the door frame 10 and the door outer panel 26 (see FIGS. 12 and 13). Herein, as shown in FIG. 12, a door-window-glass insertion hole 70, which a door window glass 30 gets into the inner space of the door body 1A through or gets out of, is provided at an upper portion of the door body 1A. A weather strip 78 is attached to the door-window-glass insertion hole 70 such that it extends in the vehicle longitudinal direction and tightly contacts both sides, in the vehicle width direction, of the door window glass 30.

The connecting frames 13, 14, 23, 24, which are made of aluminum-alloy extrusion molding, comprise, as shown in FIGS. 2-5, the inward connecting frames 13, 14 and the outward-side connecting frames 23, 24 which are positioned on inward and outward sides at upper and lower levels between the front-side vertical frame portion 11 and the rear-side vertical frame portion 12, respectively. The inward connecting frames 13, 14 comprise the beltline reinforcement inner 13 as an inward-upper connecting member which is arranged on the inward side at an upper portion of the door frame 10 and the lower frame 14 as an inward-lower connecting member which is arranged on the inward side at a lower portion of the door frame 10. The outward-side connecting frames 23, 24 comprise the beltline reinforcement outer 23 as an outward-upper connecting member which is arranged on the inward side at the upper portion of the door frame 10 and the impact bar 24 as an outward-middle-level connecting member which is arranged at a level corresponding to a waist of a passenger seated in a seat in a cabin, that is—at a middle level, in a vehicle vertical direction, of the door frame 10.

As shown in FIG. 11A, the front-side vertical frame portion 11, which is made of aluminum-alloy casting, is positioned on the outward side, in the vehicle width direction, of a hinge pillar 100 when a door is closed such that it overlaps the hinge pillar 100 when viewed from a vehicle side. The front-side vertical frame portion 11, as shown in FIGS. 2-4, comprises a plate-shaped base portion 11a which is positioned on the inward side and extends in the vertical direction, a protrusion portion 11b which protrudes outward from a rear edge of the base portion 11a along its lower edge, and a step portion 11e which protrudes outward in a step shape at a boundary portion between the base portion 11a and the protrusion portion 11b. As shown in FIG. 4, protrusion pieces 11d, 11e are integrally formed at an upper rear end and a lower rear end of the front-side vertical frame portion 11 as an inward-side attachment portion for attaching a front portion of the beltline reinforcement inner 13 or a front portion of the lower frame 14. The protrusion piece 11d formed at the upper rear end of the front-side vertical frame portion 11 is provided to protrude rearward from the flange portion 11f so as to engage with a hollow portion 13s of the beltline reinforcement inner 13 which is formed in a hollow shape (see FIGS. 4 and 11A). The protrusion piece 11e formed at the lower rear end of the front-side vertical frame portion 11 is provided to protrude rearward from a flange portion 11g which is formed at a lower rear end of the base portion 11a of the front-side vertical frame portion 11 so as to engage with a hollow portion 14s of the lower frame 14 which is formed in a hollow shape (see FIG. 4).

As shown in FIGS. 2, 4 and 7A, plural boss portions 15 (two, in the present embodiment) are integrally formed at the upper portion of the front-side vertical frame portion 11 as an outward attachment portion for attaching a front portion of the beltline reinforcement outer 23 such that they are longitudinally spaced apart from each other, and plural boss portions 16 (two, in the present embodiment) are integrally formed at a middle portion, in the vertical direction, of the front-side vertical frame portion 11 as an outward attachment portion for attaching a front portion of the impact bar 24 such that they are longitudinally spaced apart from each other. The two boss portions 15 and the two boss portions 16 are connected by ribs 15a, 16a which respectively extend in the vehicle width direction. Herein, as shown in FIGS. 2-4, 6C and 7A, a pair of upper-and-lower hinge brackets 17, 18 are provided at the front end of the front-side vertical frame portion 11, and these hinge brackets 17, 18 are fixed to portions which correspond to a door opening portion of a vehicle body by using bolts.

Further, the above-described rear-side vertical frame portion 12 is made of aluminum-alloy casting, which forms a rear side of the door body 1A. As shown in FIG. 11B, the rear-side vertical frame portion 12 is positioned on the outward side, in the vehicle width direction, of a rear pillar 101 when the door is closed such that it overlaps the rear pillar 101 when viewed from the vehicle side. The rear-side vertical frame portion 12, as shown in FIGS. 2-5 and 7A, comprises a base portion 12a, a protrusion portion 12b, and a step portion 12c, similarly to the front-side vertical frame portion 11. As shown in FIG. 4, protrusion pieces 12d, 12e are integrally formed at an upper front end and a lower front end of the rear-side vertical frame portion 12 as an inward-side attachment portion for attaching a rear portion of the beltline reinforcement inner 13 or a rear portion of the lower frame 14. The protrusion piece 12d formed at the upper front end of the rear-side vertical frame portion 12 is provided to protrude forward from a flange portion 12f so as to engage with the hollow portion 13s of the beltline reinforcement inner 13 formed in the hollow shape (see FIGS. 4 and 11B). The protrusion piece 12e formed at the lower front end of the rear-side vertical frame portion 12 is provided to protrude forward from a flange portion 12g which is formed at a lower front end of the base portion 12a of the rear-side vertical frame portion 12 so as to engage with the hollow portion 14s of the lower frame 14 formed in the hollow shape (see FIG. 4).

Further, as shown in FIGS. 2, 4 and 7A, plural boss portions 19 (two, in the present embodiment) are integrally formed at the upper portion of the rear-side vertical frame portion 12 as an outward attachment portion for attaching a rear portion of the beltline reinforcement outer 23 such that they are longitudinally spaced apart from each other, and plural boss portions 20 (two, in the present embodiment) are integrally formed at a middle portion, in the vertical direction, of the rear-side vertical frame portion 12 as an outward attachment portion for attaching a rear portion of the impact bar 24 such that they are longitudinally spaced apart from each other. The two boss portions 19 and the two boss portions 20 are connected by ribs 19a, 20a which respectively extend in the vehicle width direction.

As shown in FIGS. 2-4 and 7A, plural boss portions 21 for fixing a rear portion of an outer-handle attaching bracket 25 (see FIG. 5), which will be described later, are formed integrally with a portion of the step portion 12c which is located between the boss portions 19 and the boss portions 20 such that they are spaced apart from each other.

Further, as shown in FIGS. 2-4 and 7A, a striker engagement groove 22 is provided at a portion of the rear-side vertical frame portion 12 which is located between the boss portions 19 and the boss portions 20 such that it opens over an area from the base portion 12a to a rising portion of the step portion 12c. This striker engagement groove 22 is positioned so as to correspond to a latch-mechanism arrangement portion. A latch mechanism 66 (see FIG. 2) which is arranged at the latch-mechanism arrangement portion comprises a latch as a hook member for opening or closing the side door 1 and a latch portion to drive the latch, not illustrated. The latch is configured to detachably engage with a U-shaped connecting metal fitting, thereby locking the side door 1 in a closed state.

The beltline reinforcement inner 13 and the lower frame 14 are made of the extrusion molding as described above, and the beltline reinforcement inner 13 has the hollow portion 13s (closed cross section) extending in the vehicle longitudinal direction which engages with the above-described protrusion pieces 11d, 12d as shown in FIGS. 4, 11A, 11B, 12 and 13, and the lower frame 14 has the hollow portion 14s (closed cross section) extending in the vehicle longitudinal direction which engages with the above-described protrusion pieces 11e, 12e as shown in FIGS. 4 and 13.

Further, the protrusion piece 11d provided at the upper rear end of the front-side vertical frame portion 11 is inserted tightly and engages with a front portion of the hollow portion 13s of the beltline reinforcement inner 13 as shown in FIGS. 2, 3, 6C, 7A and 11A, and the protrusion piece 12d provided at the upper front end of the rear-side vertical frame portion 12 is inserted tightly and engages with a rear portion of the hollow portion 13s of the beltline reinforcement inner 13 as shown in FIGS. 2, 3, 5, 6C, 7A and 11B. Likewise, the protrusion piece 11e provided at the lower rear end of the front-side vertical frame portion 11 is inserted tightly and engages with a front portion of the hollow portion 14s provided at the upper portion of the lower frame 14, and the protrusion piece 12e provided at the lower front end of the rear-side vertical frame portion 12 is inserted tightly and engages with a rear portion of the hollow portion 14s provided at the upper portion of the lower frame 14 (see FIGS. 2, 3 and 6C). Thereby, the front-side vertical frame portion 11, the rear-side vertical frame portion 12, the beltline reinforcement inner 13, and the lower frame 14 are assembled together in the frame shape as the inward frames 11, 12, 13, 14 of the door frame 10, and, as shown in FIGS. 2, 5, and 6C, and an opening portion 10A is formed at a central portion of the inward frames 11, 12, 13, 14.

Further, as shown in FIGS. 2 and 4, attachment portions 13k, 13l for attaching upper portions of guide rails 31, 32 (see FIG. 2), which will be described later, are provided at front and rear positions of an outward-side face, in the vehicle width direction, of a rib 13i which extends downward at the beltline reinforcement inner 13, and attachment portions 14k, 14l for attaching lower portions of guide rails 31, 32 are provided at front and rear positions of an outward-side face, in the vehicle width direction, of the lower frame 14. As shown in FIGS. 2-4 and 7A, plural attachment portions 14m for attaching the lower portion of the door outer panel 26 (see FIG. 3) are provided at the lower frame 14 substantially at regular intervals in the vehicle longitudinal direction.

Moreover, the beltline reinforcement outer 23 is made of the extrusion molding so as to have a hollow-shaped cross section extending in the vehicle longitudinal direction, and as shown in FIGS. 2-6A, 11A, 11B and 12 especially, comprises a hollow portion 23s (closed cross section) formed inside thereof, an inward side face portion 23d which extends downward and outward, facing an outward face, in the vehicle width direction, of the door window glass 30, a lower rib 23e which extends downward and outward from a lower portion of the inward side face portion 23d, an upper rib 23f which extends upward from an upper portion of the above-described inward side face portion, and an outward side face portion 23c which faces the inward side face portion 23d with the hollow portion 23s interposed between them. As shown in FIG. 12, the inward side face 23d and the lower rib 23e of the beltline reinforcement outer 23 are configured to extend obliquely downward and outward, so that the beltline reinforcement outer 23 is refrained from deforming in the vertical direction or in the vehicle width direction. As shown in FIGS. 2, 6A, 11A, and 4 especially, plural attachment portions 23h (two, in the present embodiment) are provided to be spaced apart from each other in the longitudinal direction at the outward side face portion 23c of the front portion of the beltline reinforcement outer 23, corresponding to the plural boss portions 15 provided at the upper portion of the front-side vertical frame portion 11. Further, as shown in the same figures, plural attachment portions 23i (two, in the present embodiment) are provided to be spaced apart from each other in the longitudinal direction at the outward side face portion 23c of the rear portion of the beltline reinforcement outer 23, corresponding to the plural boss portions 19 provided at the upper portion of the rear-side vertical frame portion 12.

As shown in FIGS. 6A, 11A, and 11B, a cutout portion 23r is provided at a front end of the inward side face portion 23d of the beltline reinforcement outer 23 such that the inward side face portion 23d does not interfere with the rib 15a and the like when the attachment portions 23h are attached to the boss portions 15. Likewise, a cutout portion 23j is provided at a rear end of the inward side face portion 23d of the beltline reinforcement outer 23 such that the inward side face portion 23d does not interfere with the rib 19a and the like when the attachment portions 23i are attached to the boss portions 19 (see the same figures). As shown in FIGS. 3 and 11A, the boss portions 15 (see FIG. 4) at the upper portion of the front-side vertical frame portion 11 and the attachment portions 23h at the front portion of the beltline reinforcement outer 23 are fixed by using attaching member, such as bolts B (see FIG. 11A), and as shown in FIGS. 3, 5 and 11B, the boss portions 19 (see FIG. 4) at the upper portion of the rear-side vertical frame portion 12 and the attachment portions 23i at the rear portion of the beltline reinforcement outer 23 are fixed by using attaching member, such as bolts B (see FIG. 11B). Thus, as shown in FIGS. 3 and 5, the beltline reinforcement outer 23 faces the beltline reinforcement inner 13 on the outward side in the vehicle width direction. In the other figures than FIGS. 11A and 11B, illustration of the attaching member, such as the bolts B, is omitted.

Further, as shown in FIGS. 2-4, plural attachment portions 23a, 23b for fixing an outer-handle attaching bracket 25 (see FIG. 5), which will be described later, are provided at a rear portion of the lower rib 23e of the beltline reinforcement outer 23. As shown in FIGS. 2-6A, B, C, the upper rib 23f of the beltline reinforcement outer 23 extends straightly in the longitudinal direction so as to engage with an edge portion of an engagement recess portion 26b (see FIG. 9) which is formed at an engagement protrusion piece 26a (see FIG. 9), which will be described later, at the synthetic-resin made door outer panel 26.

As shown in FIGS. 2 and 6A, the impact bar 24 is made by the extrusion molding so as to have a hollow cross section. Plural attachment portions 24h (two, in the present embodiment) are provided to be spaced apart from each other in the longitudinal direction at an outward side face portion 24c of a front portion of the impact bar 24, corresponding to the plural boss portions 16 provided at the middle portion, in the vertical direction, of the front-side vertical frame portion 11. Further, plural attachment portions 24i (two, in the present embodiment) are provided to be spaced apart from each other in the longitudinal direction at the outward side face portion 24c of a rear portion of the impact bar 24, corresponding to the plural boss portions 20 provided at the middle portion, in the vertical direction, of the rear-side vertical frame portion 12.

As shown in FIG. 6B, a cutout portion 24r is provided at a front end of an inward side face portion 24d of the impact bar 24 such that the inward side face portion 24d does not interfere with the rib 16a and the like when the attachment portions 24h are attached to the boss portions 16. Likewise, a cutout portion 24j is provided at a rear end of the inward side face portion 24d of the impact bar 24 such that the inward side face portion 24d does not interfere with the rib 20a and the like when the attachment portions 24i are attached to the boss portions 20. As shown in FIG. 3, the boss portions 16 (see FIG. 2) at the middle portion, in the vertical direction, of the front-side vertical frame portion 11 and the attachment portions 24h (see the same figure) at the front portion of the impact bar 24 are fixed by using the attaching member, such as bolts, and as shown in FIGS. 3 and 5, the boss portions 20 (see FIG. 2) at the middle portion, in the vertical direction, of the rear-side vertical frame portion 12 and the attachment portions 24i at the rear portion of the impact bar 24 are fixed by using the attaching member, such as bolts. Thus, the impact bar 24 is attached in a slant shape such that its front end portion is located at a higher level than its rear end portion (see FIG. 3). Herein, illustration of attaching members at these portions is omitted.

<Structure of Outer-Handle Attaching Bracket>

As shown in FIGS. 2 and 3, a corner portion between an upper portion of the protrusion portion 12b of the rear-side vertical frame portion 12 and a rear portion of the beltline reinforcement outer 23 of the above-described door frame 10 corresponds to the above-described latch-mechanism arrangement portion, and the latch mechanism 66 is arranged at the latch-mechanism arrangement portion. Further, the panel-shaped outer-handle attaching bracket 25 which covers over the latch mechanism 66 from the outward side, in the vehicle width direction, of the vehicle is provided at the above-described corner portion as shown in FIGS. 3 and 5.

An outer-handle base 27 (see FIG. 3) which supports the door outer panel 26 on the inside is fixed to the outer-handle attaching bracket 25 with a contact as shown in FIGS. 10A and 12. As shown in FIG. 5, the above-described outer-handle attaching bracket 25 is formed in an inverse-trapezoidal shape, and extends in the vehicle longitudinal direction at the corner portion between the upper portion of the protrusion portion 12b and the rear portion of the beltline reinforcement outer 23 and slants such that its lower portion is positioned on the outward side, in the vehicle width direction, of the vehicle when viewed from the vehicle front (in an elevation view of the vehicle) as shown in FIG. 12. Specifically, the outer-handle attaching bracket 25 slants, as shown in FIG. 12, such that its upper end 25a is positioned on the inward side, in the vehicle width direction, of its lower end 25b, and its lower end 25b is positioned on the outward side, in the vehicle width direction, of its upper end 25a in an elevation view of the vehicle.

By providing the outer-handle attaching bracket 25 at the corner portion between the upper portion of the protrusion portion 12b of the rear-side vertical frame portion 12 and the rear portion of the beltline reinforcement outer 23 and also providing the outer-handle attaching bracket 25 to slant such that its lower portion is positioned on the outward side, in the vehicle width direction, of the vehicle in the elevation view of the vehicle as described above, the strength improvement of the corner portion both in the vertical direction and in the vehicle width direction is attained and the support rigidity improvement and the collision strength improvement of a door outer handle 28 (see FIGS. 1 and 10) are attained, and also the antitheft performance is secured by the outer-handle attaching bracket 25 covering the latch mechanism 66 from the vehicle outward side and vehicle upper side as well as the strength improvement of the corner portion.

As shown in FIG. 5, the outer-handle attaching bracket 25 includes a flange portion 25d which extends continuously to a front portion and a lower portion of a bracket body 25c and recess portions 25e, 25f which are attachment seats provided at a rear upper portion and a rear lower portion of the bracket body 25c. A fastening portion 25g which is provided at an upper end portion of the flange portion 25d and fastening portions 25h, 25h which are provided at the recess portions 25e, 25f are fixed to the attachment portion 23b and the boss portions 21, 21. As shown in FIGS. 5 and 12, ridgelines X1, X2 extending in the vehicle longitudinal direction are formed in parallel to each other at the bracket body 25c of the outer-handle attaching bracket 25, and an opening portion 29 (see FIG. 10) as a weak portion is formed at a portion of the ridgeline X1, X2. In the present embodiment, the opening portion 29 is used for arranging a key cylinder. The above-described ridgelines X1, X2 improve the vehicle-longitudinal direction rigidity and a load transmission performance of the outer-handle attaching bracket 25, and the above-described opening portion 29 prevents a stress from concentrating on a connection portion of the outer-handle attaching bracket 25 and the beltline reinforcement outer 23.

A load of the door outer panel 26 is transmitted to the outer-handle attaching bracket 25 by way of the respective elements 23f, 23d, 23e (see FIG. 13) of the beltline reinforcement outer 23 and the fastening portion 25g shown in FIG. 5, thereby providing load dispersion. The dispersed load is transmitted to the rear-side vertical frame portion 12. Further, a structural body which has a relatively-long and roughly-straight shape and extends obliquely outward and downward is formed by the beltline reinforcement outer 23 and the outer-handle attaching bracket 25, thereby increasing the rigidity both in the vertical direction and in the vehicle width direction.

In general, the upper portion of the side door is configured to be narrow from a vehicle design requirement and therefore the rigidity, in the vehicle width direction, thereof is not secured easily. Accordingly, the vertical direction rigidity is secured by extending the upper rib 23f, and also the vehicle-width direction rigidity is secured sufficiently by configuring both of the beltline reinforcement outer 23 and the outer-handle attaching bracket 25 to extend obliquely outward and downward as shown in FIG. 12. This obliquely-extending arrangement of the both 23, 25 produces a sufficient space for storing links and others of the latch mechanism inside these 23, 25 and makes the outer-handle attaching bracket 25 serve as a protector.

<Structure of Door Outer Panel and Attachment Structure to Door Frame>

As shown in FIGS. 3, 9, 12 and 13, the door outer panel 26 is made of resin and formed in a non-planar shape so as to provide a vehicle-body design. Specifically, as shown in FIGS. 9, 12, and 13, the door outer panel 26 includes an outward protrusion portion 26u which is configured such that an upper portion thereof protrudes greatly, curving outward, and also this door outer panel 26 is configured to have a smoothly-curved vertical cross section, which extends downward from an outward lower portion of the outward protrusion portion 26u and protrudes outward at a middle portion, in the vertical direction, of the door outer panel 26.

As shown in FIGS. 9 and 12, the plural (seven, in the present embodiment) engagement protrusion pieces 26a are arranged substantially at regular intervals in the longitudinal direction at a lower face of the outward protrusion portion 26u at the upper portion of the door outer panel 26. Each of the plural engagement protrusion pieces 26a is formed in a rib shape such that it protrudes downward from the lower face of the outward protrusion portion 26u and extends in the vehicle width direction, and includes the engagement recess portion 26b which engages with the upper rib 23f (see FIG. 3) provided the beltline reinforcement outer 23. The engagement recess portion 26b is provided for the engagement protrusion pieces 26a such that the engagement recess portion 26b partitions the engagement protrusion pieces 26a extending in the vehicle width direction into an inside and an outside in the vehicle width direction (see FIG. 9).

Herein, as shown in FIG. 9, in a case in which a line which connects the plural engagement recess portion 26b formed at the plural engagement protrusion pieces 26a along a groove-forming direction is set as an imaginary engagement line L, at each of the plural engagement recess portions 26b is formed each of the engagement recess portions 26b so that the imaginary engagement line L becomes a straight line. In the present embodiment, the engagement recess portions 26b are formed at the engagement recess portions 26b so that the imaginary engagement line L becomes the straight line extending in the vehicle longitudinal direction. Herein, as shown in FIG. 9, a rib 26c which extends in the vehicle longitudinal direction and protrudes downward is formed at a lower face of the outward protrusion portion 26u, and respective inward ends, in the vehicle width direction, of the plural engagement protrusion pieces 26a which are arranged to be spaced apart from each other in the vehicle longitudinal direction are connected by the rib 26c, thereby reinforcing the engagement protrusion pieces 26a.

Further, as shown in FIG. 9, at a lower edge side 26h of the door outer panel 26 are arranged plural boss portions 26d, being spaced apart from each other in the longitudinal direction, substantially at regular intervals, and also at a front edge side 26i of the door outer panel 26 are arranged plural boss portions 26e, being spaced apart from each other in the vertical direction, substantially at regular intervals. As shown in FIGS. 9, 10A and 11B, the rear edge side 26j of the door outer panel 26 has a folding piece 26f made by hemming, which is capable of engaging with a rear edge piece 12h which protrudes rearward at the protrusion portion 12b of the rear-side vertical frame portion 12.

Attaching of the above-described door outer panel 26 to the door frame 10 is done as follows. First, the engagement recess portion 26b of the upper portion of the door outer panel 26 is made to engage with the above-described upper rib 23f of the beltline reinforcement outer 23 (see FIG. 12), so that the upper portion of the non-planar shaped door outer panel 26 can be made to fixedly engage with the beltline reinforcement outer 23 extending straightly in the longitudinal direction. Further, the folding piece 26f formed at the rear edge side 26j of the door outer panel 26 is made to engage with the rear edge piece 12h of the rear-side vertical frame portion 12 (see FIGS. 10A and 11B), the boss portions 26d of the lower edge side 26h of the door outer panel 26 are made to be fixedly attached to the attachment portions 14m (see FIG. 2) of the lower frame 14 by using an attaching member, such as a tapping screw B2 (wooden screw) as shown in FIG. 13, and, as shown in FIG. 11A, the boss portions 26e of the front edge side 26i of the door outer panel 26 are made to be fixedly attached to an attachment portion 11h which is formed at the protrusion portion 11b or the like at the front-side vertical frame portion 11 by using an attaching member, such as a tapping screw B3 (wooden screw), so that the door outer panel 26 can be attached to the door frame 10. In FIG. 13, reference character 14p denotes a service hole (work hole) which is provided to penetrate an inward face, in the vehicle width direction, of the lower frame 14 for conducting fastening work of the tapping screw B2.

<Structures of Window Regulator and Module Plate>

The window regulator 40 is a device to elevate or lower the door window glass 30 so that the door window glass 30 can get in or out of the door-window-glass insertion hole 70 (see FIG. 12) at the top end of the door body 1A, which comprises, as shown in FIGS. 2, 3, 7A, 7B, and 8, a pair of front-and-rear guide rails 31, 32, a pair of front-and-rear carrier plates 33 which support the door window glass 30 and slide along the guide rails 31, 32, a connecting bracket 4 which slides together with the carrier plates 33, winding portions 34, 35, 36, 37 (see FIGS. 7A and 7B) which are provided at both upper-and-lower ends of the pair of guide rails 31, 32, a guide wire 38 which is provided in crossing around the winding portions 34, 35, 36, 37 so that a direction of the guide wire 38 can be changed, and an actuator 39 which drives the guide wire 38. The above-described window regulator 40 is attached to the door frame 10 and a resin-made module plate 41. The module plate 41 is arranged so as to cover the opening portion 10A formed at the central portion of the door frame 10 (see FIGS. 2, 5 and 6C) from the outward side, in the vehicle width direction, of the vehicle, and configured to contact an opening edge portion of the door frame 10 via a filling material 67 or the like from the outward side of the vehicle as shown in FIG. 13.

The module plate 41 includes, as shown in FIGS. 2, 7A and 7B, attachment portions 71a, 71b, 72a, 72b, 73a, 73b at respective upper ends, respective upper-side positions located below the respective upper ends, and respective lower-side positions of front- and rear sides thereof. The attachment portions 71a, 71b provided at the upper end, the attachment portions 72a, 72b provided at the upper-side positions, and the attachment portions 73, 73b provided at the lower-side positions are respectively positioned, being spaced apart from each other in the longitudinal direction, which corresponds to an arrangement gap of the pair of guide rails 31, 32. As shown in FIGS. 3 and 7A, the pair of guide rails 31, 32 are provided in parallel along an elevating/lowering direction of the door window glass, being spaced apart from each other in the longitudinal direction. The module plate 41 is, as described above, attached so as to cover the opening portion 10A of the door frame 10 from the outward side, and the pair of guide rails 31, 32 are attached to the module plate 41 from an outward side, in the vehicle width direction, of the module plate 41.

Specifically, as shown in FIGS. 7B and 8, attaching pieces 31a, 31b are provided to be spaced from each other in the vertical direction at an upper portion of a rear edge side of the front guide rail 31, and attaching pieces 32a, 32b are provided to be spaced from each other in the vertical direction at an upper portion of a front edge side of the rear guide rail 32. Likewise, as shown in FIGS. 7A and 8, attaching pieces 31c, 31c are provided to be spaced from each other in the vertical direction at a lower portion of the rear edge side of the front guide rail 31, and attaching pieces 32c, 32d are provided to be spaced from each other in the vertical direction at a lower portion of the front edge side of the rear guide rail 32. Herein, these attaching pieces 31a, 31b, 31c, 31d, 32a, 32b, 32c, 32d have attachment holes, respectively.

As shown in FIG. 7B, the attaching piece 31a of the front guide rail 31, the attachment portion 71a (see FIG. 2) of the module plate 41, and the attachment portion 13k (see FIG. 2) of the beltline reinforcement inner 13 are fastened together by using attaching members, such as bolts and nuts. Likewise, the attaching piece 32a of the rear guide rail 32, the attachment portion 71b of the module plate 41, and the attachment portion 13l of the beltline reinforcement inner 13 are fastened together by using the attaching members, such as bolts and nuts (see the same figures). As shown in FIGS. 7A and 7B, the attaching piece 31b of the front guide rail 31 and the attachment portion 72a (see FIG. 2) of the module plate 41 are fixedly attached by using the attaching members, and the attaching piece 32b of the rear guide rail 32 and the attachment portion 72b (see FIG. 2) of the module plate 41 are fixedly attached by using the attaching members. Likewise, as shown in FIG. 7A, the attaching piece 31c of the front guide rail 31 and the attachment portion 73a (see FIG. 2) of the module plate 41 are fixedly attached by using the attaching members, and the attaching piece 32c of the rear guide rail 32 and the attachment portion 73b (see FIG. 2) of the module plate 41 are fixedly attached by using the attaching members. Further, as shown in FIG. 7A, the attaching piece 31d of the front guide rail 31 and the attachment portion 14k (see FIG. 2) of the module plate 41 are fixedly attached by using the attaching members, and the attaching piece 32d of the rear guide rail 32 and the attachment portion 14l (see FIG. 2) of the lower arm 14 are fixedly attached by using the attaching members (see the same figure). Thus, the pair of guide rails 31, 32 are attached to the door frame 10 and the module plate 41 from the outward side of the vehicle.

Moreover, as shown in FIGS. 10A and 10B, the rear guide rail 32 comprises a rail portion 32f which extends in the longitudinal direction in the plan view, an inward wall portion 32g which extends from a front end of the rail portion 32f to the side of module plate 41 (to the inward side, in the vehicle direction, of the vehicle), an attaching piece 32b which extends forward from an inward end of the inward wall portion 32g along the module plate 41 so as to be attached to the module plate 41, an outward wall portion 32i which extends from a rear end of the rail portion 32f to the outward side, in the vehicle width direction, of the vehicle, and an engagement protrusion piece 32j which extends rearward from an outward end of the outward wall portion 32i and engages with a slider 54, which are formed integrally. As described above, the rear guide rail 32 is provided with the attaching pieces 32a, 32c in addition to the attaching piece 32b, and also with the attaching piece 32d which extends forward along the lower frame 14 so as to engage with the lower frame 14. Further, the front guide rail 31 is symmetrical, in the plan view, to the rear guide rail 32. Therefore, its detailed description is omitted.

As shown in FIGS. 7B and 8, the connecting bracket 47 is equipped with wire engagement portions 47c, 47d which engage with the closing guide wire 38 at its front-and-rear both sides, and also equipped with a connection portion 47e which connects the pair of front-and-rear wire engagement portions 47c, 47d between the pair of wire engagement portions 47c, 47d. The pair of wire engagement portions 47c, 47d and the connection portion 47e integrally form together a sheet of longitudinally-long panel. As shown in FIGS. 7B and 10B, clamp portions 47a, 47b (caulking pieces) to caulk the guide wire 38 are provided at tip portions of the wire engagement portions 47c, 47d, that is—at a front end portion of the front-side wire engagement portion 47c and a rear end portion of the rear-side wire engagement portion 47d, and an upper portion of the guide wire 38 extending along the front-and-rear guide rail 31, 32 are caulked by the clamp portions 47a, 47b. As shown in FIGS. 2, 7A and 7B, a glass temporary-support portion 57 which is swingable around an axis extending in the vehicle width direction with a support point of a pivotal portion 56 is provided at a middle position, in the longitudinal direction, of the connection portion 47e. A recess portion where a lower end of the door window glass 30 is arranged is integrally formed at an upper portion of the glass temporary-support portion 57.

As shown in FIG. 7B, a long hole 47f which is configured to extend vertically long so as to allow the door window glass 30 to swing is formed at a position of the connecting bracket 47 which is located (at a boundary position) between the wire engagement portion 47c or 47d and the connection portion 47e, which corresponds to a fixation portion of the connecting bracket 47 (wire engagement portion 47c or 47d) to the carrier plate 33. A pin bolt 74 which is integrally fixed to the door window glass 30 and the carrier plate 33, which will be described later, is inserted into this long hole 47f (see FIGS. 7B, 8 and 10C), and the long hole 47f has a specified gap (width) and a specified length which can allow the pin bolt 74 to slide therein according to a swing of the door window glass 30 (see FIG. 10C).

As shown in FIGS. 2, 7A, 7B, 8, 11A and 11B, the carrier plates 33 support the door window glass 30 at an outer face and both-side lower sides of the door window glass 30. The front-side carrier plate 33 is attached to the door window glass 30 at two points of a front upper portion and a rear lower portion thereof, and the rear-side carrier plate 33 is attached to the door window glass 30 at two points of a rear upper portion and a front lower portion thereof. An attachment structure of the front upper portion of the front-side carrier plate 33 and the door window glass 30 is similar to an attachment structure of the rear upper portion of the rear-side carrier plate 33 and the door window glass 30, and each of the carrier plates 33 and the door window glass 30 are fixedly fastened together by a pair of inner-and-outer bushes 42, a pair of inner-and-outer retainers 43, and a support member 46 comprising a bolt 44 and a nut 45 as shown in FIGS. 11A and 11B.

Meanwhile, an attachment structure of the rear lower portion of the front-side carrier plate 33 and the door window glass 30 is similar to an attachment structure of the front lower portion of the rear-side carrier plate 33 and the door window glass 30, and, as shown in FIG. 10C, a fixation portion 76 of the door window glass 30 and the carrier plate 33 and a fixation portion 77 of the connecting bracket 47 and the carrier plate 33 are connected coaxially, and three of the carrier plate 33, the door window glass 30, and the connecting bracket 47 are fixedly fastened together by a support member 75. That is, at each of the rear lower portion of the front-side carrier plate 33 and the front lower portion of the rear-side carrier plate 33 are fixedly fastened together the above-described three members 30, 33, 47 by the support member 75 which is composed of the pair of inner-and-outer bushes 42, the pair of inner-and-outer retainers 43, the pin bolt 74 forming a screw at its tip, and the nut 45. Herein, since the bush 42, the retainer 43, and the nut 45 of the support member 75 have similar structures to the above-described support member 46 (see FIGS. 11A and 11B), the same reference characters are used and their descriptions are omitted here.

In a state of the support member 75 in which the nut 45 is not fastened to the pin bolt 74 yet, the pin bolt 74 inserted into the long hole 47*f* is positioned at a middle position, in a longitudinal direction (hole forming direction), of the long hole 47*f* (see FIGS. 7B and 8), and the pin bolt 74 is capable of sliding along the long hole 47*f* when the door window glass 30 and the carrier plate 33 swing with the support point of the pivotal portion 56. Further, in a state in which the nut 45 is fastened to the pin bolt 74, the pin bolt 74 inserted into the long hole 47*f* is not capable of sliding, thereby prohibiting the swing of the door window glass 30. Moreover, in the state in which the nut 45 is fastened to the pin bolt 74, the front-and-rear carrier plates 33, 33 are interconnected as a unit by the connection portion 47*e* of the connecting bracket 47.

As shown in FIGS. 2, 7A and 7B, the guide wire 38 comprises an outer tube 38*a* and an inner wire 38*b*, and the inner wire 38*b* is clamped by the clamp portions 47*a*, 47*b* provided at the longitudinally-both ends of the connecting bracket 47 (see FIG. 7B). Further, the above-described actuator 39 comprises a motor 49 which installs an electric-current sensor which detects an upper-limit position, a lower-limit position, and jamming of the door window glass 30 when an electric current exceeds a threshold. As shown in FIGS. 7A and 7B, a release-side winding portion for the elevation of the door window glass 30 among the above-described winding portions 34, 35, 36 and 37, that is—the winding portion 35 provided at the lower end portion of the front-side guide rail 31 (see FIG. 7A) is configured to be a guide portion 50 which protrudes downward in a fan shape, and the other all winding portions 34, 36, and 37 than the fan-shaped guide portion 50 are configured to be pulleys 51.

Figure 14:
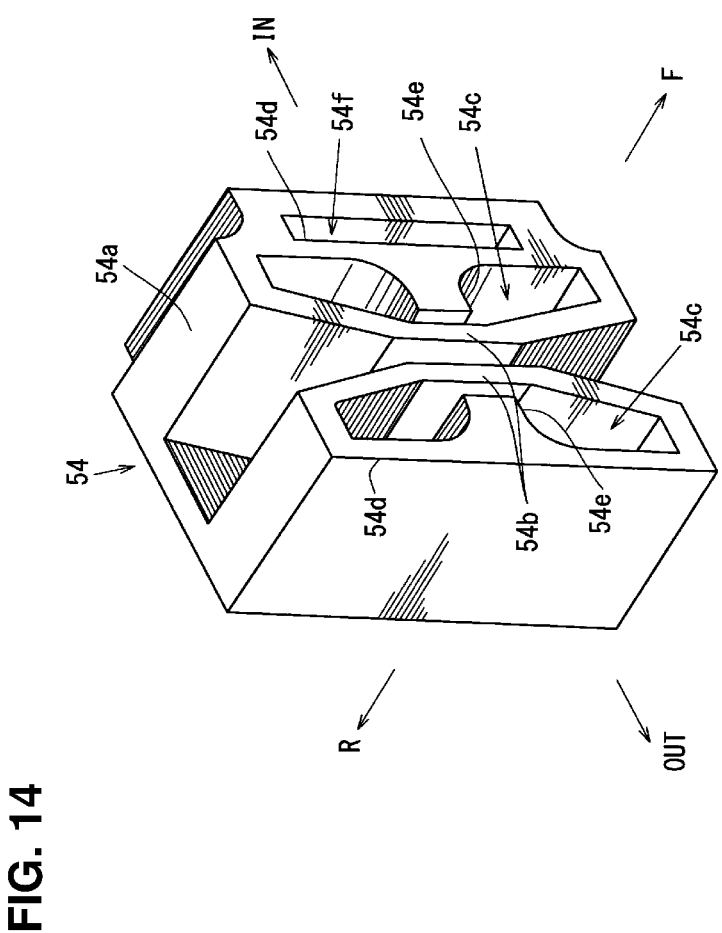
FIG. 14 is a perspective view of a slider.

FIG. 14 is a perspective view of a slider, FIG. 15A is an exploded view of a pressing member, a receiving member, and a door-beltline constituting member (beltline reinforcement inner), FIG. 15B is a sectional view taken along line F-F of FIG. 15A, FIG. 15C is an explanatory diagram showing an attachment structure of the fan-shaped guide member 50 and a down stopper 52, and FIG. 15D is an explanatory diagram of the receiving member.

As shown in FIGS. 7A and 15C, the down stopper 52 to limit a lowering position of the door window glass 30 is provided at an upper portion of the fan-shaped guide portion 50. This down stopper 52 is made of a resilient material, such as rubber or elastomer. A move of the guide wire 38 in a case of the door window glass 30 being elevated is shown by an arrow in FIG. 7A. Herein, while the winding portions 35, 37 provided at respective lower end portions of the front-and-rear guide rails 31, 32 become release-side ones, the winding portion 35 provided at the lower end portion of the front-side guide rail 31 is configured to be the fan-shaped guide portion 50 protruding downward in the present embodiment.

By configuring the release-side winding portion 35 in the case of the door window glass 30 being elevated as the fan-shaped guide portion 50 and providing the down stopper 52 at the upper portion of this fan-shaped guide portion 50 as shown in FIG. 15C, the down stopper 52 is arranged compactly by using the winding portion 35. Thereby, the elevating performance of the door window glass 30 in a normal state and the compactness are compatibly attained, and also the strength for lowering limiting of the door window glass 30 is secured.

<Support Structure of Slider>

As shown in FIGS. 7A, 7B, 8, 10, 11A and 11B, sliders 53, 54 to slide along the guide rails 31, 32 are provided at the carrier plates 33. A structure of the slider 53 sliding along the front-side guide rail 31 and its support structure and a structure of the slider 54 sliding along the rear-side guide rail 32 and its support structure are symmetrical in the plan view, so the rear-side slider 54 and its support structure will be described here.

As shown in FIG. 14, the slider 54 comprises a block-shaped slider body 54*a*, a pair of inner-and-outer resilient slide portions 54*b*, 54*b* which extend in the vertical direction and slide along a guide rail 32 formed at a central portion, in the vehicle width direction, of the slider body 54*a*, space portions 54*c*, 54*c* which are formed on the inward side and on the outward side of the pair of resilient slide portions 54*b*, 54*b*, stopper portions 54*e*, 54*e* which extend toward the resilient slide portions 54*b*, 54*b* from middle portions, in the vertical direction, of vertical walls 54*d*, 54*d* which form the space portions 54*c*, 54*c*, and an engagement hole 54*f* which is formed on the inward side, in the vehicle width direction, of the slider body 54*a* and an attaching piece 33*a* (see FIGS. 11A and 11B) formed at the carrier plate 33 engages with, which are formed integrally. The slider 54 is configured, as shown in FIGS. 10, 11A and 11B, such that the attaching piece 33*a* engages with the engagement hole 54*f* and a rear edge portion of the guide rail 32 is interposed between the pair of resilient slide portions 54*b*, 54*b* so as to slide therein. In the present embodiment, the sliders 53, 54 and the sliders 54, 54 are provided for the both carrier plates 33, 33 to spaced apart from each other in the vertical direction, respectively. As shown in FIG. 7B, the front-side slider 53 is made to engage with the front-side rail 31 from the front outward side, and the rear-side slider 54 is made to engage with the rear-side guide rail 32 from the rear outward side. By making the sliders 53, 54 engage with the guide rails 31, 31 from the longitudinal outward side as described above, the door window glass 30 is positioned in the longitudinal direction securely and also the down stopper 52 (see FIGS. 7A and 15C) is arranged compactly on the inward side (i.e., on the rear side in the longitudinal direction) of the slider 54 engaging with the front-side guide rail 31.

As shown in FIG. 15C, an attaching piece 55 to attach both of the down stopper 52 and the fan-shaped guide portion 50 vertically is formed integrally at the lower end portion of the front-side guide rail 31 by means of erecting. And, the down stopper 52 is attached to an upper portion of the attaching piece 55, and the fan-shaped guide portion 50 is attached to a lower portion of the attaching piece 55. Herein, a recess groove portion 50a to guide the guide wire 38 is formed at a peripheral face of the fan-shaped guide portion 50. By integrally forming the attaching piece 55 to attach the down stopper 52 and the fan-shaped guide portion 50 with the guide rail 3, an increase of the parts number is suppressed.

<Positioning of Door Window Glass Using Glass Temporary Support Portion>

Meanwhile, while the glass temporary-support portion 57 which temporarily supports the door window glass 30 so that the door window glass 30 can swing with the support point of the pivotal portion 56 is provided at the middle position, in the longitudinal direction, of the connecting bracket 47 as shown in FIGS. 7A and 7B, the positioning of the door window glass 30, i.e., the carrier plates 33, by using the glass temporary-support portion 57 will be described.

A lower end of the door window glass 30 is arranged in a recess portion of the glass temporary support portion 57, and the pin bolt 74 is made to freely slide in the long hole 47f by unfastening the nut 45 of the support member 75 (see FIG. 10C), thereby allowing the swing of the door window glass 30. In this state, the window regulator 40 is driven, the upper end of the door window glass 30 is made to contact a body-side roof side rail portion 102 and a front pillar portion 103 (see FIG. 1), and the door window glass 30 is positioned via the glass temporary support portion 57 swinging with the support point of the pivotal portion 56. Then, the nut 45 is fastened to the pin bolt 74 of the support member 75. Thereby, the door window glass 30 can be easily poisoned and fixed at an appropriate position when the door window glass 30 is shut off. That is, the side door 1 of the present embodiment is configured such that the door window glass 30 is temporally supported by the support member 75 provided at the middle portion, in the longitudinal direction, of the connecting bracket 47 with the support point of the pivotal portion 56, and the door window glass 30 and the carrier plate 33 are easily positioned to an appropriate position from a position which is influenced by slackening of the guide wire 38 or the like. This structure is particularly effective to a sashless type of side door in which the door window glass 30 is supported by the guide rails 31, 32 and the like from the longitudinal both sides, having a high rigidity, like the side door 1 of the present embodiment.

Next, an up stopper to limit the upper-limit position of the door window glass 30 and its surrounding structure will be described referring to FIGS. 12, 15A, 15b and 15D. As shown in FIG. 12, an up stopper 60 comprises a pressing member 62, as a lower-side member of the glass side, which is fixed to the carrier plate 33 by a screw 61 and a receiving member 64, as the upper-side member of the door side, which is adjustably attached to the belt line reinforcement inner 13 so as to move in the longitudinal direction by using the bolt 63.

While either one of the lower-side member (the pressing member 62) and the upper-side member (the receiving member 64) has a concave portion and the other has a recess (concave) portion, a convex portion 62a which has a wedge shape (specifically, a trapezoidal shape having a vertically long size) is formed at the pressing member 62 as the lower-side member and a recess portion 64a which has a shape corresponding to the above-described wedge shape is formed at the receiving member 64 as the upper-side member in the present embodiment. As shown in FIGS. 15B and 15D, contact faces 64b, 64c which slant in the vertical direction in the side view are formed at the receiving member 64 as shown in FIGS. 15B and 15D. As shown in these figures, the above-described contact faces 64b, 64c of the present embodiment slant outward and outward in the vehicle width direction such that their front portions are relatively close to the beltline reinforcement inner 13 and their rear portions are relatively far way from the beltline reinforcement inner 13. Further, as shown in FIGS. 12, 15A, 15B and 15D, the above-described receiving member 64 is configured to slide horizontally (i.e., in the vehicle longitudinal direction) relative to ribs (specifically, an upward facing rib 13a and a lateral rib 13b) of the beltline reinforcement inner 13 as a door beltline forming member.

Thereby, by merely making the receiving member 64 as the upper-side member slide horizontally relative to the ribs 13a, 13b of the beltline reinforcement inner 13, the positioning, in the vertical direction, of the door window glass 30 can be attained, thereby facilitating the positioning. Further, by making the receiving member 64 with the pressing member 62, the upper-limit position of the door window glass 30 can be limited so that the upper-limit position and the above-described vertical-direction position become appropriate, thereby securing the performance of suction prevention of the door window glass 30. That is, the upper-limit position of the door window glass 30 can be limited by the up stopper 60, so that it can be prevented that the door window glass 30 is elevated excessively. Also, since the positioning, in the vertical direction, of the door window glass 30 can be attained, the vibration prevention of the door window glass 30 during a normal traveling state and the suction prevention of the door window glass 30 which is caused by a negative pressure generated during a high-speed traveling state can be compatibly attained.

In this connection, while another member than the up stopper is provided for the vertical-direction positioning of the door window glass in a conventional structure, the upper-limit position's limiting and the vertical-direction positioning of the door window glass 30 can be attained by the up stopper 60 in the present embodiment. The contact face 64b is formed at a portion of the above-described receiving member 64 which is positioned along a glass face 13c of the beltline reinforcement inner 13, and this contact face 64b slants obliquely upward and toward the door window glass 30. Thereby, when the upper-limit position of the door window glass 30 is limited, a positioning load in a state in which the convex portion 62a of the pressing member 62 is inserted into the recess portion 64a of the receiving member 64 is received by the above-described beltline reinforcement inner 13, thereby supporting the door window glass 30 firmly.

The above-described beltline reinforcement inner 13, which is made of the extrusion molding of the light metal or the light metal alloy described above, comprises the hollow portion 13s (closed cross section), four sides enclosing the hollow portion 13s which comprises an upper piece 13e, a lower piece 13f, an outer piece 13g, and an inner piece 13h, the above-described lateral rib 13b which protrudes toward the glass side on an extensional line of the upper piece 13e, the above-described upward facing rib 13a which protrudes upward on an extensional line of the outer piece 13g, and the above-described downward-extending rib 13i which extends downward from the vicinity of a connecting corner portion of the outer piece 13g and the lower piece 13f, which are formed integrally.

As shown in FIG. 15A, the above-described receiving member 64 has an engagement recess portion 64d with which the above-described lateral rib 13b engages and a groove portion 64e into which the above-described upward facing rib 13a is inserted, additionally to the recess portion 64a. That is, the door-side receiving member 64 is configured to have a cross section which engages with the above-described respective ribs 13a, 13b. Further, the receiving member 64 has a fastening portion 64f which is formed on an opposite side to the door window glass 30 of the upper facing rib 13a, i.e., on the inward side, in the vehicle width direction, of the vehicle, and this fastening portion 64f (see the bolt 63, particularly) is configured to be openable from a cabin side when the side door is closed, thereby facilitating positioning work of the door window glass 30.

The above-described door structure of the automotive vehicle V comprises the door frame 10 which comprises the vertical frame portions 11, 12 which are provided at the both side portions, in the vehicle longitudinal direction, of the door frame 10 and the plural connecting frames 13, 14, 23, 24 (the beltline reinforcement inner 13, the lower frame 14, the beltline reinforcement outer 23, and the impact bar 24) which connect the vertical frame portions 11, 12 (see FIGS. 2-5, 6A, 6B, 6C and 7A), the above-described vertical frame portions being the aluminum-alloy casting, the above-described plural connecting frames being the aluminum-alloy hollow extrusion molding, and the door outer panel 26 formed in the non-planar shape, wherein the above-described plural connecting frames 13, 14, 23, 24 of the door frame 10 comprise the beltline reinforcement inner 13 and the lower frame 14 which are positioned on the inward side, in the vehicle width direction, of the door frame 10 and the beltline reinforcement outer 23 and the impact bar 24 which are positioned on the outward side, in the vehicle width direction, of the door frame 10, the front-side vertical frame portion 11 is provided with the protrusion pieces 11d, 11e which respectively engage with the lower frame 14 and the beltline reinforcement inner 13 in the longitudinal direction of the members 14, 13 and also the rear-side vertical frame portion 12 is provided with the protrusion pieces 12d, 12e which respectively engage with the lower frame 14 and the beltline reinforcement inner 13 in the longitudinal direction of the members 14, 13 (see FIG. 4), the attachment portions (23h, 15), (24h, 16), (23i, 19), (24i, 20) which attach the outward connecting frames 23, 24 and the vertical frame portions 11, 12, specifically, the attachment portion 23h and the boss portion 15 which attach the front portion of the beltline reinforcement outer 23 and the front-side vertical frame portion 11, the attachment portion 24h and the boss portion 16 which attach the front portion of the impact bar 24 and the front-side vertical frame portion 11, the attachment portion 23i and the boss portion 19 which attach the rear portion of the beltline reinforcement outer 23 and the rear-side vertical frame portion 12, and the attachment portion 24i and the boss portion 20 which attach the rear portion of the beltline reinforcement outer 23 and the rear-side vertical frame portion 12 are provided at different points in the longitudinal direction of the outward connecting frames 23, 24 (see FIGS. 2-5, 6A, 6B and 7A), and the beltline reinforcement outer 23 is provided with the upper rib 23f which engages with the engagement recess portion 26b provided at the upper portion of the door outer panel 26 (see FIGS. 3, 9 and 12).

According to the above-described structure, since the door frame 10 is formed by the vertical frame portions 11, 12 made of the aluminum casting and also the connecting frames 13, 14, 23, 24 made of the aluminum extrusion molding, the light weight and the productivity (assemblability) can be secured. Also, even if the connecting frames 13, 14, 23, 24 use the aluminum extrusion molding, the structure in which the protrusion pieces 11d, 11e, 12d, 12e provided at the vertical frame portions 11, 12 engage with the hollow portions 13s, 14s provided at the inward connecting frames 13, 14 (see FIGS. 2, 11A and 11B) and the structure in which the outward connecting frames 23, 24 and the vertical frame portions 11, 12 are attached via the plural attaching members provided in the longitudinal direction are adopted, so that the rigidity can be secured. Specifically, when the side door 1 receives an inward lateral load at the middle portions, in the longitudinal direction (longitudinal direction) of the outward connecting frames 23, 24 in a vehicle side collision or the like, a pressing force acts on the outward connecting frames 23, 24 such that the middle portions of these frames 23, 24 deform inward in the vehicle width direction. Thereby, a tensional load acts on the front-and-rear both end portions of the outward connecting frames 23, 24. However, since the outward connecting frames 23, 24 and the vertical frame portions 11, 12 have respectively two attachment points in the vehicle longitudinal direction (the longitudinal direction of the outward connecting frames 23, 24) at the attachment portions (23h, 15), (24h, 16), (23i, 19), (24i, 20) for attaching these members, a superior tensional rigidity can be secured. Accordingly, the outward connecting frames 23, 24 can resist against the tensional load acting on their longitudinal both sides even when receiving the lateral load at their middle portions, so that these frames 23, 24 are not detached off the vertical frame portions 11, 12. Thus, the outward connecting frames 23, 24 can receive the latera load properly.

Meanwhile, the inward connecting frames 13, 14 are made of the hollow extrusion molding and the vertical frame portions 11, 12 are provided with the protrusion pieces 11d, 11e, 12d, 12e which engage with the inward connecting frames 13, 14 in the longitudinal direction, and the protrusion pieces 11d, 11e, 12d, 12e of the vertical frame portions 11, 12 engage with the hollow portions 13s, 14s of the inward connecting frames 13, 14 from the longitudinal both end portions of the hollow portions 13s, 14s. Accordingly, in a case in which the middle portions, in the longitudinal direction, of the outward connecting frames 23, 24 deform inward and then hit against the inward connecting frames 13, 14 when the side door 1 receives the lateral load in the vehicle side collision or the like, even if a moment load acts on the longitudinal respective portions of the inward connecting frames 13, 14, the door structure can be properly reinforced by the protrusion pieces 11d, 11e, 12d, 12e engaging with the hollow portions 13s, 14s of the inward connecting frames 13, 14 so that the closed cross sections of the hollow portions 13s, 14s of the inward connecting frames 13, 14 do not crush. That is, the inward connecting frames 13, 14 can secure the bending rigidity, preventing a decrease of modulus of section, by engagement of the protrusion pieces 11d, 11e, 12d, 12e with the hollow portions 13s, 14s, thereby receiving the lateral load properly.

Moreover, since the outward connecting frames 23, 24 are attached to the vertical frame portions 11, 12 at the plural points (two points, in the present embodiment) of the attachment portions (23h, 15), (24h, 16), (23i, 19), (24i, 20) as described above, a longitudinal load, such as a vehicle-frontal collision load, can be properly transmitted between the front-side vertical frame portion 11 and the rear-side vertical frame portion 12 as well. The inward connecting frames 13, 14 can promote the engagement of the protrusion pieces 11d, 11e, 12d, 12e with the hollow portions 13s, 14s. That is, when the forward load is inputted to the frames 13, 14, the protrusion pieces 11d, 11e, 12d, 12e engaging with the hollow portions 13s, 14s provided at the front end portions of these frames 13, 14 can further engage with these hollow portions 13s, 14s. Likewise, when the rearward load is inputted to the frames 13, 14, the protrusion pieces 11d, 11e, 12d, 12e engaging with the hollow portions 13s, 14s provided at the rear end portions of these frames 13, 14 can further engage with these hollow portions 13s, 14s. Accordingly, the present door structure can increase the connection force of the inward connecting frames 13, 14 and the vertical frame portions 11, 12 for any of the forward load and the rearward load, thereby receiving the longitudinal load properly. As described above, since the door structure of the present embodiment comprises the outward connecting frames 23, 24 which are attached to the vertical frame portions 11, 12 by the plural attachment portions (23h, 15), (24h, 16), (23i, 19), (24i, 20) along the longitudinal direction and the inward connecting frames 13, 14 with which the protrusion pieces 11d, 11e, 12d, 12e engage, the light-weight and high-rigidity performance and the assemblability of the door structure can be compatibly attained, reducing cost reduction by adopting more extrusion moldings and fewer castings.

In general, the front pillar 103 (see FIG. 1) is configured to slant inward toward its upper portion from its lower portion in the front view (elevational view) from viewpoints of reduction of influence of lateral wind or the vehicle-body rigidity. Also, the roof side rail 102 (see the same figure) is generally arranged on the inward side, in the vehicle width direction, of the door body 1A. Accordingly, the door window glass 30 is provided to slant upward and inward so that its top portion can contact the roof side rail 102 and the front pillar 103 when being elevated, whereas it is arranged vertically roughly straightly so that it can be stored inside the door body 1A when being lowered. The guide rails 31, 32 are generally configured to be curved so that its upper side is positioned inward relative to its lower side in the vehicle front view, corresponding to a vertical move of the door window glass 30 described above.

Further, as shown in FIGS. 3, 9, 12 and 13, the door outer panel 26 is generally configured to be curved such that the middle portion, in the vertical direction, thereof protrudes outward in the vehicle front view from perspectives of the design property and the like. However, in a case in which the door outer panel 26 having the above-described curve configuration and the guide rails 31, 32 are attached to the connecting members 13, 14, 23, 24 made longitudinally straightly by the extrusion molding, this attaching is not done smoothly or weather strips are not properly attached between the members, so that there is a concern that the water-stopping performance may not be secured.

According to the door structure of the present embodiment, however, the non-planar shaped door outer panel 26 having the curve configuration in the vehicle front view can be attached to the straight-shaped beltline reinforcement outer 23 through adjustment of the attaching position by making the upper rib 23f provided at the beltline reinforcement outer 23 of the outward connecting frames 23, 24 in particular engage with the engagement recess portion 26b provided at the upper portion of the door outer panel 26 as shown in FIGS. 9 and 12. Moreover, since the guide rails 31, 32 and the like are configured such that their attaching pieces 31a, 32a, 31d, 32d are attached to the attachment portions 13k, 13l, 14k, 14l provided at the beltline reinforcement inner 13 and the lower frame 14, in particular, via the module plate 41 or directly or via as shown in FIGS. 4, 7A and 7B, the attachment position of the guide rails 31, 32 and the door outer panel 26 can be adjusted consequently via the connecting frames 13, 14, 23, 24 as well. That is, a difference in engagement point (position) between the straight-shaped connecting frames 13, 14, 23, 24 and the curve-configured door outer panel 26 or guide rails 31, 32 can be absorbed by the engagement position of the upper rib 23f and the engagement recess portion 26b. Accordingly, the door outer panel 26 and the guide rails 31, 32 which are provided at the door structure can be configured in the curved shape in the vehicle front view from perspectives of design or function, the assemblability of the straight-shaped connecting frames 13, 14, 23, 24 and the curve-configured door outer panel 26 or guide rails 31, 32 can be secured in order to increase the load-transmission performance, considering layout of the straight-shaped connecting frames 13, 14, 23, 24 made of the extrusion molding extending in the longitudinal direction.

An example of assembly steps of the door structure of the present embodiment will be described. The inward frames 11, 12, 13, 14 (the front-side vertical frame portion 11, the rear-side vertical frame portion 12, the beltline reinforcement inner 13, and the lower arm 14) are assembled, and the window regulator 40 is assembled to the inward frames 11, 12, 13, 14 from the vehicle outward side in a state in which it has been previously attached to the module plate 41. Then, by attaching the outward connecting frames 23, 24 to the front-side vertical frame portion 11 and the rear-side vertical frame portion 12, the door frame 10 in a state of the window regulator 40 being stored is constituted (see FIG. 3). After the positioning of the door window glass 30 by using the above-described glass temporary support portion 57 in the above-described state is complete, the door outer panel 26 is attached to the door frame 10 as described above.

The side door 1 of the present embodiment is the sashless type, so the window regulator 40 of the present embodiment uses a high-rigidity and large-sized window regulator which is capable of driving and supporting the door window glass 30 from the both sides of the pair of front-and-rear guide rails 31, 32. However, by attaching the door outer panel 26 to the door frame 10 after attaching of the window regulator 40 like the above-described assembly steps, the large-side window regulator 40 can be easily assembled into the door body 1A despite its large size. That is, it is unnecessary to assemble the window regulator 40 into the door body 1A by carrying the window regulator 40 through the insertion hole 70 (see FIG. 12) from above the door body 1A or through the opening portion 10A (see FIG. 2) of the door frame 10, so that the assembling of the window regulator 40 into the door body 1A can be made easy.

Further, it is preferable that the size of the closed cross sections of the connecting frames 13, 14, 23, 24 be made large or a reinforcing rib be provided at the connecting frames 13, 14, 23, 24 in order to improve the performance of load transmission, in the vehicle width direction, of the door body 1A. However, the large-sized connecting frames 13, 14, 23, 24 may deteriorate the assembling of the internal modules (auxiliary devices) or the like, such as the window regulator 40, so that there is a problem that compatibility of the strength and the assemblability may become difficult. According to the door structure of the present embodiment, however, the door outer panel 26 can be attached to the door frame 10 after attaching the internal modules, such as the window regulator 40. Additionally, the door outer panel 26 can be easily and precisely, without positional mismatch, attached to the beltline reinforcement outer 23 by making the upper rib 23f provided at the beltline reinforcement outer 23 engage with the engagement recess portion 26b provided at the upper portion of the non-planar shaped door outer panel 26, so that the strength and the assemblability can be compatibly attained easily.

In the embodiment of the present invention, the door frame 10 comprises a pair of upper-and-lower inward connecting frames 13,14 as the inward connecting member, which are provided at the upper and lower levels of the door frame 10 so as to connect the both vertical frame portions 11, 12 (the front-side vertical frame portion 11 and the rear-side vertical frame portion 12), and the both inward connecting frames 13, 14 and the both vertical frame portions 11, 12 are configured in a frame shape (see FIGS. 2 and 6C). According to this structure, since the vertical frame portions 11, 12 made of the casting and the inward connecting frames 13, 14 made of the hollow extrusion molding are configured in the frame shape, the light-weight and high-rigidity side door 1 can be made at low costs.

Further, in the embodiment of the present invention, the door outer panel 26 is made of resin, the upper portion of the door outer panel 26 and the beltline reinforcement outer 23 are made to engage with each other by the engagement recess portion 26 and the upper rib 23f (see FIGS. 9 and 12), the rear edge side 26j of the door outer panel 26 and the rear-side vertical frame portion 12 of the door frame 10 are made to engage with each other by the rear edge piece 12h and the folding piece 26f (see FIGS. 10A and 11B), the lower edge side 26h of the door outer panel 26 and the lower frame 14 of the door frame 10 are joined to each other at the boss portions 26d and the attachment portions 14m by using the tapping screws B2 (see FIG. 13), and the front edge side 26i of the door outer panel 26 and the front-side frame portion 11 of the door frame 10 are joined to each other at the boss portions 26e and the attachment portions 11h by using the tapping screws B3 (see FIG. 11A). Since only the two sides of the lower edge side 26h and the front-side vertical frame portion 11 among the four sides forming the periphery of the door outer panel 26 are attached to the door frame 10 by using the attaching members, such as the tapping screws B2, B3 as described above, the number of attachment points can be reduced. Moreover, by configuring that the two sides of the upper side (upper portion) and the rear edge side 26j among the four sides forming the periphery of the door outer panel 26 engage with the door frame 10, the door outer panel 26 can be attached to the door frame 10 from its temporarily-attached state, so that the door outer panel 26 can be easily attached to the door frame 10. Further, by configuring that the two sides of the upper side (upper portion) and the rear edge side 26j among the four sides forming the periphery of the door outer panel 26 engage with the door frame 10, the resin-made door outer panel 26 and the aluminum or aluminum-alloy made door frame 10 can be attached properly by easily absorbing a difference in thermal extension between the different materials.

Also, in the embodiment of the present invention, the door is the side door 1, the front-side vertical frame portion 11 overlaps the hinge pillar 100 when viewed from the vehicle side as shown in FIG. 11A, and the rear-side vertical frame portion 12 overlaps the rear pillar 101 when viewed from the vehicle side as shown in FIG. 11B. According to this embodiment, the collision load transmitted from the hinge pillar 100 can be received properly by the front-side vertical frame portion 11 made of the hard casting in the vehicle frontal collision. Then, this load can be transmitted to the rear-side vertical frame portion 12 made of the casting by way of the connecting frames 13, 14, 23, 24 made of the extrusion molding extending straightly in the longitudinal direction, and then transmitted from the rear-side vertical frame portion 12 to the rear pillar 101. By configuring that the vehicle-frontal collision load is transmitted and dispersed from the hinge pillar 100 to the rear pillar 101 via the side door 1, the vehicle-frontal collision load can be properly received and a survival space for passengers in the cabin can be maintained.

Further, the above-described sashless type of side door 1 comprises the door frame 10 which comprises the inward frames 11, 12, 13, 14 (the front-side vertical frame portion 11, the rear-side vertical frame portion 12, the beltline reinforcement inner 13, and the lower frame 14) and the outward connecting frames 23, 24 (the beltline reinforcement outer 23 and the impact bar 24), the module plate 41 which supports the door window glass 30 so that it can be elevated or lowered, and the window regulator 40 which includes the two guide rails 31, 32 (see FIGS. 2 and 3). The two guide rails 31, 32 are fixed to the module plate 41, respectively (see FIGS. 3 and 7A). The module plate 41 is fixed to an edge of the opening portion 10A provided at the inward frames 11, 12, 13, 14 and the two guide rails 31, 32 are fixed (see FIGS. 3, 7A and 13).

Moreover, the attachment portions 23h, 23i and the boss portions 15, 19 which are capable of afterward attaching the beltline reinforcement outer 23 to the vertical frame portions 11, 12 are respectively provided at the beltline reinforcement outer 23 and the vertical frame portions 11, 12, and the attachment portions 24h, 24i and the boss portions 16, 20 which are capable of afterward attaching the impact bar 24 to the vertical frame portions 11, 12 are respectively provided at the impact bar 24 and the vertical frame portions 11, 12 (see FIGS. 2-6A, 6B and 7A). Also, the boss portion 26e and the attachment portion 11h which are capable of afterward attaching the door outer panel 26 to the door frame 10 are respectively provided at the front edge side 26i of the door outer panel 26 and the front-side vertical wall portion 11 of the door frame 10 (see FIGS. 9 and 11A), and the boss portion 26d and the attachment portion 14m which are capable of afterward attaching the door outer panel 26 to the door frame 10 are respectively provided at the lower edge side 26h of the door outer panel 26 and the lower frame 14 of the door frame 10 (see FIGS. 9 and 13).

According this structure, the window regulator 40 which is provided with the module plate 41 and the guide rails 31, 32 and the door outer panel 26 can be attached to the inward frames 11, 12, 13, 14 from the outward side in this order. That is, since the window regulator 40 can be attached before the door outer panel 26 is attached to the inward frames 11, 12, 13, 14, the window regulator 40 and the module plate 41 can be easily attached to the inward frames 11, 12, 13, 14 (specifically the beltline reinforcement inner 13 and the lower frame 14) despite these members 40, 41 being large sized. Further, the two guide rails 31, 32 are fixed to the module plate 41 at their upper-and-lower side positions. That is, the attaching pieces 31a, 32a provided at the upper-upper sides of the guide rails 31, 32, the attachment portions 71a, 71b (see FIG. 2) of the module plate 41, and the attachment portions 13k, 13l (see FIG. 2) of the beltline reinforcement inner 13 are fastened together (see FIG. 7B), and the attaching pieces 31c, 32c provided at the lower-upper sides of the guide rails 31, 32 and the attaching portions 73a, 73b (see FIG. 2) of the module plate 41 are fixedly attached (see FIG. 7A). Thereby, the module plate 41 and the guide rails 31, 32 are formed integrally so as to reinforce each other, thereby providing the high rigidity. The large-sized window regulator 40 can be provided by strengthening the module plate 41 and the guide rails 31, 32 as described above. Further, since the door window glass 30 can be supported by the large-sized window regulator 40, the glass support rigidity can be improved consequently.

Additionally, it is unnecessary to provide the wide door-window-glass insertion hole 70 (see FIG. 12) formed at the upper portion of the door body 1A so that the hole 70 has a large width which is wide enough to allow the window regulator 40 to be instated therein. Also, the large cross sections of the inward connecting frames 13, 14 and the outward connecting frames 23, 24 which are arranged in the longitudinal direction at the upper portion of the door body 1A can be secured. Therefore, the glass support rigidity of the door frame 10 can be increased further as well.

Specifically, the module plate 41 is tightly fixed to the edge of the opening portion 10A provided at the center of the inward frames 11, 12, 13, 14 from the outward side (see FIGS. 3, 7A and 13). Further, the attachment portions 23h, 23i, 24h, 24i and the boss portions 15, 19, 16, 20 which are capable of afterward attaching the outward connecting frames 23, 24 to the vertical frame portions 11, 12 among the inward frames 11, 12, 13, 14 are provided at these members 11, 12, 13, 14 (see FIG. 4), and also the door outer panel 26 is provided at the door frame 10 so as to be attached than an attachment timing of the module plate 41 (see FIGS. 9 and 12). Accordingly, even if the module plate 41 becomes a large-sized one having a vertically long or the like, this module plate 41 can be easily attached to the inward connecting frames 13, 14.

That is, according to the door structure of the present embodiment, even if the inward connecting frames 13, 14 are provided to be spaced apart from each other in the vertical direction having a large gap between them so as to form the opening portion 10A, the module plate 41 can be attached to these frames 13, 14 as well. Therefore, compared with the conventional structure in which the window regulator is attached to the door frame later than the attachment timing of the door outer panel or the window regulator being inserted through the opening portion provided at the inward frames and attached from the inward side of the vehicle, the door structure of the present embodiment can arrange the inward connecting frames 13, 14 in the vertical direction, having as an large gap between them as possible, so that the bending rigidity of the cross sections of the inward frames 11, 12, 13, 14 (the cross section secondary moment around a longitudinal axis) can be increased.

Herein, since the inward frames 11, 12, 13, 14 are configured such that the opening portion 10A is formed at the center by the vertical frame portions 11, 12 provided at the front-and-rear sides and the inward connecting frames 13, 14 provided at the upper-and-lower sides, there is a problem that while the inward connecting frames 13, 14 having the larger vertical gap can increase the bending rigidity as described above, the size of the opening portion 10A becomes so wide that improper deformation of a parallelogram shape (a rhombic shape) may be caused easily. By contrast, the module plate 41 and the guide rails 31, 32 are mutually reinforced so as to provide the high rigidity and attached to the inward connecting frames 13, 14 arranged vertically as described above. Particularly, since the upper-upper side attaching pieces 31a, 32a of the guide rails 31, 32, the attachment portions 71a, 71b (see FIG. 2) of the module plate 41, and the attachment portions 13k, 13l (see FIG. 2) of the beltline reinforcement inner 13 are fastened together (see FIG. 7B), the rigidity can be secured so as not to cause the above-described improper deformation of the parallelogram shape (the rhombic shape).

That is, it can be prevented that some water comes in between the door window glass 30 and the weather strip 78 attached to the door-window-glass insertion hole 70 provided at the upper portion of the door body 1A (see FIG. 12). Moreover, since the module plate 41 is attached tightly to the edge of the opening portion 10A provided at the inward frames 11, 12, 13, 14 from the outward side of the vehicle, even if water W comes into the internal space of the door body 1A through a space between the weather strip 78 and the door window glass 30 at the door-window-glass insertion hole 70 provided at the upper portion of the door body 1A as shown in FIG. 13, the water W does not come in toward the inside of the door body 1A (the cabin) through the gap between the module plate 41 and the lower frame 14 nor stay in the gap, and also the water W can be drained to the outside of the door body 1A along an outer face of the lower frame from an outer face of the module plate 41, which is preferable from perspectives of water stopping.

In the embodiment of the present invention, as shown in FIG. 10B, the rear-side guide rail 32 comprises the rail portion 32f which extends vertically in the vehicle front view, curving, the inward wall portion 32g which extends from the rail portion 32f to the module plate 41, and the attaching pieces 32a, 32b, 32c which extend from the inward end of the inward wall portion 32g along the module plate 41 so as to be attached to the module plate 41 (see FIGS. 2, 7A, 7B and 8). The rear-side guide rail 32 further comprises the attaching piece 32d which extends forward along the lower frame 14 so as to be attached to the lower frame 14 (see the same figure). Herein, the front-side guide rail 31 is symmetrical to the rear-side guide rail 32 in the plan view and configured to have the similar structure to the rear-side guide rail 32. According to the above-described structure, the formability (dimensional accuracy) of the guide rails 31, 32 and the glass support rigidity can be improved.

Specifically, in general, the guide rail is configured in the curved shape such that its upper-side portion is positioned on the inward side, in the vehicle width direction, from its lower-side portion in the vehicle front view, which corresponds to a vertical-move locus. Further, since the sashless type of door generally requires the glass support rigidity more than the sash type, a window regulator to reinforce a member, such as the guide rail to guide the door window glass, is used widely, for example.

Meanwhile, a conventional guide rail is configured as disclosed by Japanese Patent Laid-Open Publication No. 10-037592 such that guide grooves (24, 30) capable of engaging with sliders (26, 32) are provided to extend in a longitudinal direction, there are provided bridges (74, 76) as a bracket to be fixed to a base (12), and this guide rail is fixed integrally to the base (12) via the bridges (74, 76). The conventional guide rail is generally configured such that the guide grooves (24, 30) have a U-shaped (C-shaped) cross section. The conventional guide rail described above has merits that the rigidity can be easily secured, the sliders can be made to engage firmly, and the dimensional error of the guide rail itself can be easily absorbed by having its engagement with the sliders loose. However, since the guide rail is generally configured in the curved shape in the vehicle front view as described above and also configured to have a wide cross section for reinforcement in order to secure the glass support rigidity corresponding to the sashless type of door, the above-described conventional guide rail has a demerit that it may be difficult to form it cross section in the U shape (C shape), securing the necessary accuracy which is required as the guide rail.

By contrast, the guide rail 32 of the present embodiment comprises the rail portion 32*f*, the inward wall portion 32*g*, and the attaching pieces 32*a*, 32*b*, 32*c*, 32*d* (see FIGS. 7A, 7B, 8 and 10B). According to this structure, since the rail portion 32*f* is configured in a straight-line shape in the plan view, unlike the conventional guide rails having the U-shaped cross section (see FIG. 10B), the guide rail can be formed so as to provide the sufficient dimensional accuracy. Moreover, by forming the rail portion 32*f* in a simple shape so as to easily secure the sufficient dimensional accuracy which is required as the guide rail 32, the guide rail 32 of the present embodiment does not need to be formed by being attached to any other member for securing the dimensional accuracy of the guide rail like the conventional guide rail and bridge (bracket), so that the rail portion 32*f*, the inward wall portion 32*g*, and the attaching pieces 32*a*, 32*b*, 32*c*, 32*d* can be formed integrally. That is, the guide rail of the present embodiment can be made of a single member by the forming or the like, so that the parts number or the assembly steps can be reduced and also its assemblability to the module plate 41 can be improved. Also, since the guide rail 23 of the present embodiment can be formed in a so-called open-type shape by the rail portion 32*f*, the inward wall portion 32*g*, and the attaching pieces 32*a*, 32*b*, 32*c*, 32*d* like the conventional guide rail having the U-shaped cross section (see FIG. 10B), the formability (workability) can be improved. Additionally, since the guide rail 32 of the present embodiment comprises the inward wall portion 32*g* and the outward wall portion 32*i* which extend in the width direction (see FIG. 10B), the rigidity, in the width direction, of the guide rail 32 can be secured, and by integrally fixing the present guide rail 32 to the facial-shaped module plate 41 extending in the vertical direction and the longitudinal direction, the width-directional rigidity of the module plate 41, particularly, can be increased as well. Herein, since the front-side guide rail 31 is symmetrical to the rear-side guide rail 32 in the plan view as described above, the front-side guide rail 31 can provide the same effects as the guide rail 32, of course.

In the embodiment of the present invention, as shown in FIGS. 2-6C and 7A, the inward frames 11, 12, 13, 14 comprise the front-and-rear vertical wall portions 11, 12 made of the aluminum casting and the inward connecting frames 13, 14 made of the extrusion molding provided between the vertical frame portions 11, 12. According to this structure, since the inward frames 11, 12, 13, 14 are configured in the frame shape such that the opening portion 10A is formed at the central portion by the front-and-rear vertical frame portions 11, 12 and the upper-and-lower inward connecting frames 13, 14, and the vertical frame portions 11, 12 and the inward connecting frames 13, 14 are made of the aluminum or aluminum alloy, the side door 1 can be made to have light weight and high rigidity as a whole.

Herein, while in the case in which the opening portion 10A is formed at the center like the inward frames 11, 12, 13, 14 as described above, there is a concern that the improper deformation of the parallelogram shape may be caused as described above, since the module plate 41 is tightly fixed to the edge of the opening portion 10A from the outward side of the vehicle and the two guide rails 31, 32 are fixed as described above, the inward frames 11, 12, 13, 14 can be reinforced by the module plate 41 and the two guide rails 31, 32 so as not to cause the above-described deformation of the parallelogram shape. Accordingly, since even the slight (small) deformation of the parallelogram shape of the inward frames 11, 12, 13, 14 can be prevented by the front-and-rear vertical frame portions 11, 12 and the upper-and-lower in ward connecting frames 13, 14, the light-weight and high-rigidity structure and the water-stopping performance of the side door 1 as a whole can be combatively attained, and in particular, the sufficient glass support rigidity required to the sashless type of side door 1 can be secured.

Further, the above-described door structure is the door structure of the vehicle V which is provided with the window regulator 40 inside the door body 1A which supports the door window glass 30 so as to elevate or lower the door window glass 30, which comprises the pair of carrier plates 33, 33 which attach the pair of guide rails 31, 32 and the door window glass 30 to the window regulator 40, the pair of wire engagement portions 47*c*, 47*d* which engage with the crossing guide wire 38, and the connection portion 47*e* which connects the pair of wire engagement portions 47*c*, 47*d*, wherein the glass temporary-support portion 57 is provided the connection portion 47*e* as the door-window temporary support portion which supports the door window glass 30 so that the door window glass 30 can swing is provided the connection portion 47*e* (see FIGS. 7A and 7B), the long hole 47*f* is provided at the fixation portion 77 of the wire engagement portions 47*c*, 47*d* to the carrier plate 33 as a swing allow portion which allows the door window glass 30 to swing with the support point of the glass-temporary support portion 57, and the pin bolt 74 and the nut 45 are provided as a fixing means for fixing the door window glass 30 so as not to allow it to swing (see FIG. 10C).

According to the above-described structure, the carrier plate 33 can be positioned easily and accurately at the wire engagement portions 47*c*, 47*d* per the above-described positioning steps of the door window glass 30 using the glass-temporary support portion 57. Specifically, when the side door 1 is assembled to the door opening of the automotive vehicle V, for example, the door window glass 30 is elevated up to the stop position, where the door window glass 30 contacts and biases the weather strip (not illustrated) provided at the window-frame upper side of the vehicle-body side portion, such as the roof side rail 102 or the front pillar 103.

At this point, the door window glass 30 receives a reaction force from the weather strip. However, since the door window glass 30 is supported by the glass-temporary support portion 57 so as to swing, it is obliquely positioned such that the reaction force becomes roughly equal at an entire part of a contact portion with the weather strip and also it becomes a temporary support state. That is, the door window glass 30 is closed such that no gap is created between the door window glass 30 and the weather strip and an excessive biasing force is not generated at the weather strip.

Then, the door window glass 30 which has been temporarily supported by the glass-temporary support portion 57 can be fixed finally and completely by fastening the nut 45 to the pin bolt 74 at the fixation portion 77 of the carrier plate 33 which is integrally attached to the door window glass 30 and the wire engagement portions 47*c*, 47*d* to which the guide wire 38 is attached. That is, until the fixation portion 77 of the wire engagement portions 47*c*, 47*d* and the carrier plate 33 is fixed, the door window glass 30 is temporarily supported by the glass-temporary support portion 57 provided at the connection portion 47*e* so as to swing, and also the connection portion 47*e* is connected to the pair of wire engagement portions 47c, 47d. Accordingly, after the above-described final and complete fixation of the fixation portion 77 with fastening, the support by the glass-temporary support portion 57 is released and the support of the door window glass 30 which has been done by the guide wire 38 via the connection portion 47e is conducted by the guide wire 38 via the carrier plate 33.

Thereby, the door window glass 30 can be fixed after the positioning. Additionally, since the connection portion 47e is connected to the pair of wire engagement portions 47c, 47d, it is prevented that the guide wire 38 rotates around the axis unexpectedly until the temporarily-supported door window glass 30 is fixed finally, that is—until the carrier plate 33 and the wire engagement portions 47c, 47d are fixed, so that the positioning adjustment of the door window glass 30 can be easily conducted. Accordingly, the positioning work of the door window glass 30 when the side door 1 is assembled to the vehicle body can be precise (correct) and easy, so that the assembling of the window regulator 40 can be conducted easily.

In the embodiment of the present invention, the connection portion 47e and the pair of wire engagement portions 47c, 47d provided at the longitudinal both sides of the connecting bracket 47 are integrally formed by a single panel (see FIG. 7B). According to this structure, since the connection portion 47e and the pair of wire engagement portions 47c, 47d are not formed by different members but formed as the single panel-shaped connecting bracket 47, so that any increase of the parts number can be properly suppressed.

Further, in the embodiment of the present invention, the fixation portion 76 of the door window glass 30 to the carrier plate 33 and the fixation portion 77 of the wire engagement portions 47c, 47d to the carrier plate 33 are interconnected coaxially (see FIG. 10C). According to this structure, the fixation portions 77, 76 can be integral, and the fixation means can be unified as the pin bolt 74 and the nut 45, and the number of those can be suppressed. Further, the number of bolt insertion holes and the like are reduced, thereby securing the strength, and the glass-support strength can be improved.

Moreover, the above-described embodiment is the door structure of the automotive vehicle which comprises the pair of front-and-rear guide rails 31, 32, the pair of front-and-rear carrier plates 33, 33 which slide along the guide rails 31,32 and which the door window glass 30 is attached to and supported by, the winding portions 34-37 which are provided at the upper-and-lower end portions of the both guide rail 31, 32, the guide wire 38 which is provided in crossing around the winding portions 34-37 and changed in direction at the winding portions 34-37, and the window regulator 40 which is provided with the actuator 39 to drive the guide wire 38, wherein the release-side winding portion 35 for the elevation of the door window glass 30 is configured to be the fan-shaped guide portion 50 protruding downward, the other winding portions 34, 36, 37 are configured to be the pulleys 51, and the down stopper 52 to limit the lowering position of the door window glass 30 is provided at the upper portion of the fan-shaped guide portion 50 (see FIGS. 7A and 15C).

According to this structure, since the release-side winding portion 35 for the elevation of the door window glass 30 is configured to be the fan-shaped guide portion 50 and the down stopper 52 is provided at the upper portion of the fan-shaped guide portion 50, the down stopper 52 can be arranged compactly by using the winding portion 35, and the strength for the lowering limit can be secured, compatibly attaining the elevation/lowering performance of the door window glass 30 in the normal state and its compactness. Herein, it is preferable that the above-described actuator 39 include the motor 49 installing the electric-current sensor which detects the upper-and-lower limit positions and the jamming of the door window glass 30 when the electric current exceeds the threshold.

In the embodiment of the present invention, the sliders 53, 54 which slide along the guide rails 31, 32 are provided at the carrier plate 33, and the sliders 53, 54 are configured to engage with the front-side guide rail 31 from the forward and outward side and engage with the rear-side guide rail 32 from the rearward and outward side (see FIG. 7A). According to this structure, since the sliders 53, 54 engage with the guide rails 31, 32 from the forward/rearward and outward sides, the poisoning of the door window glass 30 in the longitudinal direction can be attained securely and also the down stopper 52 can be compactly arranged on the inward side (on the rearward side in the longitudinal direction) of the slider 53 engaging with the front-side guide rail 31.

In the embodiment of the present invention, the attaching piece 55 which attach both of the down stopper 52 and the fan-shaped guide portion 50 to its upper and lower portions is integrally provided at the guide rail 31 (see FIG. 15C). According to this structure, since the attaching piece 55 attaching the down stopper 52 and the fan-shaped guide portion 50 is integrally provided at the guide rail 31, the increase of the parts number can be suppressed.

The connecting member of the present invention corresponds to the connecting frames 13, 14, 23, 24 of the embodiment. Likewise, the inward connecting member corresponds to the inward connecting frames 13, 14, the outward connecting member corresponds to the outward connecting frames 23, 24, the protrusion portion corresponds to the protrusion pieces 11d, 11e, 12d, 12e or a protruding piece 11d' which will be described later, the attachment portion corresponds to the attachment portions 23h, 23i, 24h, 24i and the boss portions 15, 16, 19, 20, the rib corresponds to the upper rib 23f, the groove corresponds to the engagement recess portion 26b, one of the side portions corresponds to the rear edge side 26j, the lower portion corresponds to the lower edge side 26h, and the other of the side portions corresponds to the front edge side 26i. However, the present invention is not to be limited to the above-described embodiment.

For example, while the inward connecting frames 13, 14 and the protrusion pieces 11d, 12d, 11e, 12e are configured to engage by pressing the protrusion pieces 11d, 12d, 11e, 12e into the hollow portions 13s, 14s of the front-and-rear portions of the inward connecting frames 13, 14 in the present embodiment, an adhesive agent may be applied between inner faces of the inward connecting frames 13, 14 and outer faces of the protrusion pieces engaging with the hollow portions 13s, 14s of the inward connecting frames 13, 14, and the both members may engage with each other with the adhesive agent. Further, the protrusion pieces 11d, 12d, 11e, 12e engaging with the hollow portions 13s, 14s of the inward connecting frames 13, 14 may be fixed with pins.

Specifically, as shown in another embodiment illustrated by imaginary lines in the major-part enlarged view of FIG. 11A, each of the front-and-rear sides of the inward connecting frame 13 has a pin insertion hole 83, into which a pin 82 to fix the protrusion piece 11d' engaging with the hollow portion 13s is inserted, and an adhesive agent 81 is applied between the inner face of the inward connecting frame 13 and the protrusion piece 11d' engaging with the hollow portion 13s. By pressing the pin 82 into the pin insertion hole 83, the protrusion piece 11d' engaging with the hollow portion 13s is fixed by this pin 82. Herein, the pin 82 may be provided for temporary fixing of the protrusion piece 11d' and the adhesive agent 81 may be pulled out of the pin insertion hole 83 after the adhesive agent 81 has been dried, or the adhesive agent 81 may be made to stay in the pin insertion hole 83 even after the adhesive agent 81 has been dried. In the latter case, since the pin 82 can be prevented from shifting even if the adhesive agent 81 deteriorates over time, it can be prevented that the protrusion piece 11d' is drawn out of the hollow portion 13s of the inward connecting frames 13, 14 in the vehicle collision.

Herein, since a bending load (a load in a gouging direction) acts more greatly than a drawing load (a load in the longitudinal direction) in a vehicle side collision, merely fixing the protrusion piece 11d' engaging with the hollow portion 13s with the pin 82 is effective from viewpoints of shift prevention. Moreover, by fixing the protrusion piece 11d' engaging with the hollow portion 13s of the inward connecting frame 13 by using the adhesive agent 81 and the pin 82, the protrusion piece 11d' can be made to engage with the hollow portion 13s more easily than the case of pressing, thereby improving the assemblability of the inward connecting frame 13 and the front-side vertical frame portion 11. While the adhesive agent may be dried by applying the heat aggressively even in a natural dry, the heat which has been used in an assembly step of the door frame 10 may be utilized for the drying of the adhesive agent. Specifically, after the side door 1 has been assembled to the door opening of the vehicle body of the present embodiment, the heat which has been used for drying paint in a vehicle-body painting step may be utilized for drying of the adhesive agent.

Further, while the plural engagement protrusion pieces 26a are formed at the lower face of the outward protrusion portion 26u provided at the upper portion of the door outer panel 26, the engagement recess portion 26b is formed at each of the plural engagement protrusion pieces 26a, and the imaginary engagement line L connecting the plural engagement recess portions 26b is configured to match the longitudinal direction in the present embodiment (see FIG. 9), each position of the engagement recess portions 26b may be changed from each other in the vehicle width direction, for example, such that the above-described imaginary engagement line L slants relative to the longitudinal direction in the plan view. Thereby, when the non-planar shaped door outer panel 26 is attached to the beltline reinforcement outer 23 extending straightly in the longitudinal direction, the door outer panel 26 can be attached to the beltline reinforcement outer 23, having any attaching angle, in the plan view, in accordance with the slant angle of the imaginary engagement line L relative to the longitudinal direction.

Moreover, while the above-described positioning work of the door window glass 30 is conducted by elevating the door window glass 30 and making it contact the weather strip (not illustrated) provided at the window-frame upper side of the vehicle-body side, such as the roof side rail 102 or the front pillar 103, this is not limited to the work done when the side door 1 has been assembled to the door opening of the automotive vehicle V. For example, the positioning may be conducted before the assembling to the vehicle body by using a jig for positioning (not illustrated) which has a window-frame shaped element which is similar to the above-described window-frame upper side of the vehicle-body side, such as the roof side rail 102 or the front pillar 103.

The material of the door outer panel is not limited to resin, which is used in the present embodiment, but any light-metal material, such as aluminum or aluminum alloy, or any other material may be used. The door structure of the present invention is applicable not only to the side door 1 like the present embodiment but to any rear door, and also may be applied to a door provided with a sash, not being limited to the sashless type of door.

What is claimed is:

1. A door structure of an automotive vehicle, comprising:
   a door frame comprising a front-side vertical frame portion and a rear-side vertical frame portion which are respectively provided at front-and-rear side portions, in a vehicle longitudinal direction, of the door frame and plural connecting members which connect the front-side and rear-side vertical frame portions at a beltline position of a door, the front-side and rear-side vertical frame portions being a light-metal casting, the plural connecting members being a light metal hollow extrusion molding, wherein said light metal is aluminum, alloy of aluminum, magnesium, or alloy of magnesium; and
   a door outer panel formed in a non-planar shape,
   wherein said plural connecting members of the door frame comprise an inward-beltline connecting member which is positioned on an inward side, in a vehicle width direction, of the door frame and an outward-beltline connecting member which is positioned on an outward side, in the vehicle width direction, of the inward-beltline connecting member of the door frame,
   said front-side and rear-side vertical frame portions of the door frame are provided with protrusion portions which respectively engage with said inward-beltline connecting member in a longitudinal direction of the inward-beltline connecting member,
   plural attachment portions which attach said outward-beltline connecting member and said front-side and rear-side vertical frame portions are provided at different points in a longitudinal direction of the outward-beltline connecting member,
   said outward-beltline connecting member is provided with a rib or flange which engages with an engagement portion provided at an upper portion of said door outer panel, and
   said door outer panel is made of resin, and said engagement portion provided at the door outer panel comprises an engagement protrusion piece which protrudes downward and extends in the vehicle width direction at a lower face of the upper portion of the door outer panel and an engagement recess portion which is formed at the engagement protrusion piece so as to match said rib or flange provided at the outward-beltline connecting member for engaging therewith.

2. The door structure of the automotive vehicle of claim 1, wherein said door frame further comprises a lower connecting frame which is provided at a lower level than said inward-beltline connecting member so as to connect the front-side and rear-side vertical frame portions.

3. The door structure of the automotive vehicle of claim 2, wherein the upper portion of said door outer panel and one of a front edge side and a rear edge side of the door outer panel engage with said door frame, and a lower portion of the door outer panel and the other of the front edge side and the rear edge side of the door outer panel are fixedly joined to the door frame by using a fixing means.

4. The door structure of the automotive vehicle of claim 3, wherein said inward-beltline connecting member and said protrusion portions of the front-side and rear-side vertical frame portions which engage with the inward-beltline connecting member are fixed by an adhesive agent and a pin.

5. The door structure of the automotive vehicle of claim 4, wherein the door is a side door, and said front-side vertical frame portion of the door frame overlaps a hinge pillar when viewed from a vehicle side and said rear-side vertical frame portion of the door frame overlaps a pillar located in back of the door when viewed from the vehicle side.

6. The door structure of the automotive vehicle of claim 3, wherein the door is a side door, and said front-side vertical frame portion of the door frame overlaps a hinge pillar when viewed from a vehicle side and said rear-side vertical frame portion of the door frame overlaps a pillar located in back of the door when viewed from the vehicle side.

7. The door structure of the automotive vehicle of claim 2, wherein said inward-beltline connecting member and said protrusion portions of the front-side and rear-side vertical frame portions which engage with the inward-beltline connecting member are fixed by an adhesive agent and a pin.

8. The door structure of the automotive vehicle of claim 7, wherein the door is a side door, and said front-side vertical frame portion of the door frame overlaps a hinge pillar when viewed from a vehicle side and said rear-side vertical frame portion of the door frame overlaps a pillar located in back of the door when viewed from the vehicle side.

9. The door structure of the automotive vehicle of claim 2, wherein the door is a side door, and said front-side vertical frame portion of the door frame overlaps a hinge pillar when viewed from a vehicle side and said rear-side vertical frame portion of the door frame overlaps a pillar located in back of the door when viewed from the vehicle side.

10. The door structure of the automotive vehicle of claim 1, wherein the upper portion of said door outer panel and one of a front edge side and a rear edge side of the door outer panel engage with said door frame, and a lower portion of the door outer panel and the other of the front edge side and the rear edge side of the door outer panel are fixedly joined to the door frame by using a fixing means.

11. The door structure of the automotive vehicle of claim 10, wherein said inward-beltline connecting member and said protrusion portions of the front-side and rear-side vertical frame portions which engage with the inward-beltline connecting member are fixed by an adhesive agent and a pin.

12. The door structure of the automotive vehicle of claim 11, wherein the door is a side door, and said front-side vertical frame portion of the door frame overlaps a hinge pillar when viewed from a vehicle side and said rear-side vertical frame portion of the door frame overlaps a pillar located in back of the door when viewed from the vehicle side.

13. The door structure of the automotive vehicle of claim 10, wherein the door is a side door, and said front-side vertical frame portion of the door frame overlaps a hinge pillar when viewed from a vehicle side and said rear-side vertical frame portion of the door frame overlaps a pillar located in back of the door when viewed from the vehicle side.

14. The door structure of the automotive vehicle of claim 1, wherein said inward-beltline connecting member and said protrusion portions of the front-side and rear-side vertical frame portions which engage with the inward-beltline connecting member are fixed by an adhesive agent and a pin.

15. The door structure of the automotive vehicle of claim 14, wherein the door is a side door, and said front-side vertical frame portion of the door frame overlaps a hinge pillar when viewed from a vehicle side and said rear-side vertical frame portion of the door frame overlaps a pillar located in back of the door when viewed from the vehicle side.

16. The door structure of the automotive vehicle of claim 1, wherein the door is a side door, and said front-side vertical frame portion of the door frame overlaps a hinge pillar when viewed from a vehicle side and said rear-side vertical frame portion of the door frame overlaps a pillar located in back of the door when viewed from the vehicle side.

17. The door structure of the automotive vehicle of claim 1, wherein said engagement protrusion piece of the engagement portion provided at the door outer panel is comprised of plural pieces which are arranged at intervals in a longitudinal direction of the door outer panel and said engagement recess portion of the engagement portion provided at the door outer panel is comprised of plural grooves which are respectively formed at said plural pieces.

* * * * *